(12) United States Patent
Szajnowski

(10) Patent No.: US 8,599,062 B2
(45) Date of Patent: Dec. 3, 2013

(54) OBJECT DETECTION WITH MULTIPLE FREQUENCY CHIRPS

(75) Inventor: Wieslaw Jerzy Szajnowski, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 274 days.

(21) Appl. No.: 13/003,919

(22) PCT Filed: Jul. 30, 2009

(86) PCT No.: PCT/EP2009/059862
§ 371 (c)(1),
(2), (4) Date: Jan. 13, 2011

(87) PCT Pub. No.: WO2010/012801
PCT Pub. Date: Feb. 4, 2010

(65) Prior Publication Data
US 2011/0122014 A1 May 26, 2011

(30) Foreign Application Priority Data
Jul. 31, 2008 (GB) .................................. 0814062.6

(51) Int. Cl.
*G01S 13/58* (2006.01)
(52) U.S. Cl.
USPC ............................ 342/109; 342/118; 342/104
(58) Field of Classification Search
USPC ................................................. 342/104–146
See application file for complete search history.

(56) References Cited

U.S. PATENT DOCUMENTS

| 4,234,882 A | 11/1980 | Thompson |
| 4,509,049 A * | 4/1985 | Haendel et al. ................. 342/87 |
| 5,477,226 A | 12/1995 | Hager et al. |
| 6,396,436 B1 * | 5/2002 | Lissel et al. ..................... 342/70 |
| 6,700,536 B1 * | 3/2004 | Wiegand ....................... 342/417 |
| 6,856,280 B1 | 2/2005 | Eder et al. |
| 2003/0052813 A1 | 3/2003 | Natsume |
| 2005/0179582 A1 * | 8/2005 | Woodington et al. ........... 342/70 |
| 2008/0186223 A1 | 8/2008 | Mayer et al. |

FOREIGN PATENT DOCUMENTS

| DE | 10303587 A1 | 8/2004 |
| EP | 18431689 A1 | 10/2007 |
| EP | 2006709 A1 | 12/2008 |
| GB | 2408645 A | 6/2005 |
| JP | 2004-85452 A | 3/2004 |
| WO | WO 2006/034888 A1 | 4/2006 |
| WO | WO 2007/147533 A1 | 12/2007 |

* cited by examiner

*Primary Examiner* — Timothy A Brainard
(74) *Attorney, Agent, or Firm* — Birch, Stewart, Kolasch & Birch, LLP

(57) ABSTRACT

A system and method are disclosed for the generation and processing of waveforms utilized to modulate the carrier frequency of a microwave sensor employed, to determine the range and velocity of an object of interest. The system and method result in improved performance in environments with high levels of interference.

20 Claims, 16 Drawing Sheets a)

b)

OBJECT DETECTION WITH MULTIPLE FREQUENCY CHIRPS

FIELD OF THE INVENTION

This invention relates to a method and apparatus for the generation and processing of waveforms utilized to modulate the carrier frequency of a microwave sensor employed to determine the range and velocity of an object of interest. The method is especially, but not exclusively, applicable to automotive multiuser FMCW radar intended to operate in environments with high level of interference.

BACKGROUND OF THE INVENTION

The growing demand for autonomous cruise control and collision warning/avoidance systems has stimulated the development of frequency-modulated continuous-wave (FMCW) automotive radar. Most of the radars under development operate in the 77-GHz band, which has been reserved for these applications.

A functional block diagram of FMCW radar is depicted in FIG. 1. The system comprises a triangular waveform generator WFG 101, a voltage-controlled oscillator VCO 102 acting also as an up-converter, a coupler CPL 103, a circulator CIR 104 to provide a single-antenna operation, a transmit-receive antenna TRA 105, a quadrature mixer QMX 107, a frequency analyzer FAN 108, and a digital signal processor DSP 109.

The triangular waveform generator WFG produces a control signal CV to vary the frequency of the voltage-controlled oscillator VCO in a triangular fashion. A resulting waveform TW transmitted by the antenna TRA has a constant amplitude but its frequency sweeps the band $\Delta f$ during each sweep interval $T_S$, as depicted schematically in FIG. 2a.

The echo RW from an obstacle OBS 106 at range R is an attenuated replica of the transmitted waveform TW, delayed in time by $\tau=2\cdot R/c$, where c is the speed of light. The echo RW is mixed in the quadrature mixer QMX with a portion of the transmitted waveform TW supplied by the coupler CPL. Output signals QS of the mixer QMX are analyzed in the frequency analyzer FAN to produce a beat frequency BF with the magnitude $|f_R|$ directly proportional to obstacle range $$|f_R| = \left(\frac{|\Delta f|}{T_S}\right)\left(\frac{2\cdot R}{c}\right) = |S|\cdot \tau$$

where $|S|=|\Delta f|/T_S$ is the slope of a frequency sweep.

The beat frequency $f_R$, defined as the frequency of a reflected wave minus the frequency of an interrogating wave, is positive for frequency down-sweeps (S<0), and negative for frequency up-sweeps (S>0); hence $$f_R = -S\cdot \tau$$

As known from prior art, discrimination between positive and negative beat frequencies can be accomplished when a radar system utilizes quadrature signal processing.

FIG. 2a shows schematically linear frequency variations of both the transmitted and received waveforms, and also the resulting beat frequency. As seen, the beat frequency $f_R$ has a constant magnitude except at the extremes of the sweeps (this effect is negligible in practice).

A relative movement with radial velocity V between the radar and obstacle will superimpose on the beat frequency $f_R$ a Doppler frequency shift $$f_v = \frac{2\cdot V}{\lambda}$$

where $\lambda=c/f_C$ is the wavelength, and $f_C$ is the carrier frequency of radar transmission. In practice, the value of Doppler shift $f_V$ is not affected by frequency modulation because the carrier frequency $f_C$ is much greater than the band $\Delta f$ occupied by frequency sweeps.

For an obstacle approaching the radar with velocity V, the Doppler shift $f_V$ will be positive, whereas the shift $f_V$ will be negative for an obstacle moving away from the radar. Therefore, a measured beat frequency $f_B$ will result from two frequency components, $f_R$ and $f_V$, suitably combined to produce a composite beat frequency $$f_B = f_R + f_V = -S\cdot\tau + f_V$$

It should be noted that the slope S itself can be negative (for a down-sweep) or positive (for an up-sweep).

FIG. 2b illustrates the case, in which a received waveform is delayed and Doppler-shifted with respect to a transmitted waveform.

The digital signal processor DSP uses measured beat frequency values BF, supplied by the frequency analyzer FAN, to determine both the range R and the relative velocity V of an obstacle. Estimated values of range N and velocity V are produced at output RV of the processor DSP. For correct operation, the signal processor DSP receives from the waveform generator WFG a synchronizing pulse SC indicative of the beginning and direction of each frequency sweep.

In the field of automotive radar, the main research and development effort has been concentrated on hardware demonstrations of required functionality and potential performance. However, the important problem of resistance to mutual interference has been almost neglected. It is evident now that automotive radar will become a commercial success only if the problem of resistance to multiuser interference has been solved.

It appears that conventional FM patterns and associated signal processing techniques employed in automotive radar can be severely affected by multiuser interference. Although some forms of interference can be tolerated in a properly designed system, there are others which are impossible to suppress. Consequently, conventional FM systems operating in dense-signal multiuser environment can only provide inferior obstacle detection and poor estimation of its range and velocity.

The negative effects of multiuser interference can be to some extent alleviated by utilizing irregular and non-repeating patterns of frequency modulation. For example, patent application EP 07 252 352.5 discloses an automotive radar system in which the frequency of a transmitter is varied in time in a piecewise-linear, yet non-deterministic and irregular, 'zigzag' fashion, so arranged as to exploit the maximum spread of allocated frequency band. The contents of patent application EP 07 252 352.5 are enclosed herein by reference.

It can be shown that the use of a randomized frequency walk can reduce the effects of mutual in-band interference caused by other users operating in the same region and sharing the same frequency band. However, efficient methods are still required which are capable of optimal processing of multi-slope FM chirp signals such as those utilized in a randomized frequency walk.

Therefore, it would be desirable to provide a method and apparatus for FM waveform design and generation that would result in improved resistance to multiuser interference, especially in automotive radar.

It would also be desirable to provide a method and apparatus for determining the range and/or velocity of a detected object in automotive radar that employs a composite multi-slope FM chirp waveform and is capable to operate in a dense-signal multiuser environment.

SUMMARY OF THE INVENTION

According to one aspect of the invention, a method of detecting an object is provided, the method comprising transmitting a varying-frequency signal of finite duration,
receiving a reflection of the transmitted signal from the object, and
determining the range and/or the velocity of the object on the basis of the transmitted signal and the received signal, wherein
the said transmitted signal comprises a sequence of at least four adjacent portions (K),
the frequency of the signal varies linearly with time within each of the said portions,
and the linear frequency variation has a different slope within each portion.

According to another aspect of the invention, a method of detecting an object is provided, the method comprising
transmitting a varying-frequency signal,
receiving a reflection of the transmitted signal from the object, wherein,
the transmitted signal comprises a sequence of K portions, and
the frequency of the signal varies linearly with time within each of the said portions (k) with k=1, . . . , K, and
the method further comprising
determining the range and/or the velocity of the object on the basis of normalized slopes ($S_k$) for each portion (k).

According to another aspect of the invention, an automotive radar apparatus is provided, comprising
a transmitter operable to transmit a varying-frequency signal,
a receiver operable to receive a reflection of the transmitted signal from the object, and
a signal processor operable to determine the range and/or the velocity of the object on the basis of the transmitted signal and the received signal,
further comprising
a signal generator operable to provide a varying-frequency signal such that the transmitted signal comprises a sequence of at least four adjacent portions (K), such that the frequency of the signal varies linearly with time within each of the said portions and such that the linear frequency variation has a different slope within each portion.

According to another aspect of the invention, an automotive radar apparatus is provided, comprising
a transmitter operable to transmit a varying-frequency signal,
a receiver operable to receive a reflection of the transmitted signal from the object,
a signal generator operable to provide a varying-frequency signal such that the transmitted signal comprises a sequence of K portions, and such that the frequency of the signal varies linearly with time within each of the said portions, and
a signal processor operable to determine the range and/or the velocity of the object on the basis of normalized slopes ($S_k$) for each portion (k).

According to another aspect of the invention, a method of detecting an object is provided, the method comprising
transmitting a varying-frequency signal,
receiving a reflection of the transmitted signal from the object, and
determining beat frequencies ($f_{Bk}$) between the transmitted signal and the received signal,
wherein,
the transmitted signal comprises a sequence of K portions (k), and
the frequency of the signal varies linearly with time within each of the said portions (k), and
the portions exist in K/2 pairs of opposite and/or inverse normalized slopes $S_k$,
and further comprising
calculating a range and/or velocity of the object from the beat frequencies ($f_{Bk}$) and their respective slopes ($S_k$) K/2 times, each time with one of the pairs excluded from the calculation process, determining if a calculation with a pair generates a result located outside of a cluster formed by the results of the other pairs, and
outputting the range and/or velocity given by the said result.

DESCRIPTION OF EMBODIMENTS

A surveillance region of interest, such as motorway, can be illuminated with a frequency-modulated (FM) waveform comprising a plurality of frequency up-chirps and down-chirps, i.e. portions of the transmitted varying-frequency signal in which the frequency of the signal varies linearly with time. Each frequency chirp, or portion of waveform, is characterized by its duration and the slope of its linear frequency-modulation law. In practice, it is convenient, although not necessary, to utilize frequency chirps of the same duration.

Figure 3:
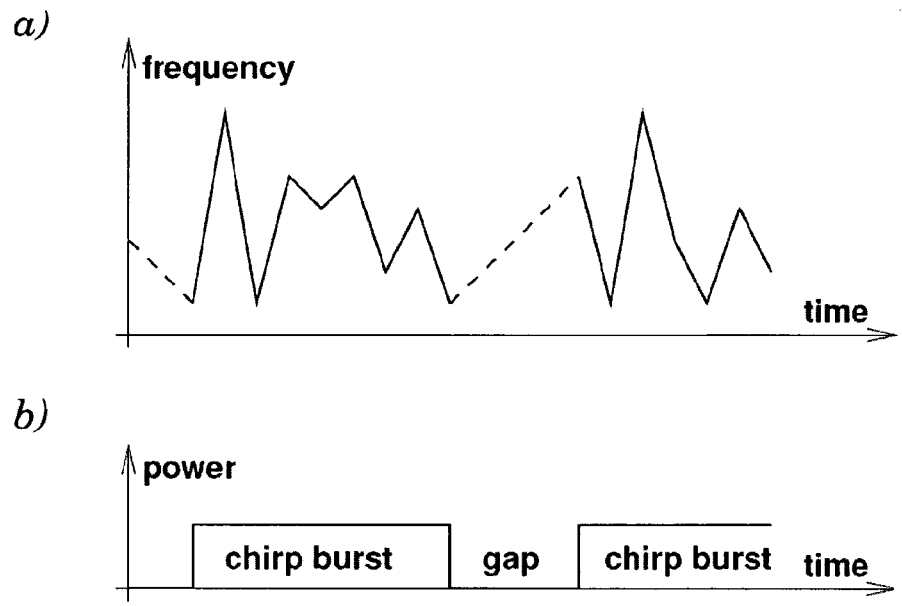
FIG. 3a is an example of a frequency-time characteristic of a chirp burst suitable for a multiuser automotive FMCW radar system, according to an embodiment of the invention.
FIG. 3b is an example of a power-time characteristic of a chirp burst suitable for a multiuser automotive FMCW radar system, according to an embodiment of the invention.

According to an embodiment of the invention, FIG. 3a depicts an example of a frequency-time characteristic of a composite illuminating waveform comprising frequency chirps of the same duration but having different slopes. In this case, each finite chirp sequence, i.e., a chirp burst, is followed by a time gap during which no power is transmitted, as shown in FIG. 3b.

An object of interest is represented by a point $(\tau_0, f_{V0})$ in a time-frequency plane $(\tau, f_V)$, where $\tau_0$ is the round-trip delay of an illuminating wave, and $f_{V0}$ is the Doppler frequency. The round-trip delay and the Doppler frequency are indicative, respectively, of the range and the radial velocity of the object.

When an object, appearing at range $R_0$ and moving with radial velocity $V_0$, is illuminated with a frequency chirp having slope $S_k$, the value of an observed beat frequency $f_{Bk}$ can be expressed as $$f_{Bk} = f_{R0} + f_{V0} = -S_k \tau_0 + f_{V0},$$

where $\tau_0 = 2 \cdot R_0/c$, and $f_{V0} = 2 \cdot V_0/\lambda$; for a down-chirp, $S_k < 0$, and for an up-chirp, $S_k > 0$. The observed beat frequency $f_{Bk}$ results from shifting (up or down) the frequency component, $f_{R0}$ (due to range alone) by the Doppler frequency $f_{V0}$.

Figure 4:
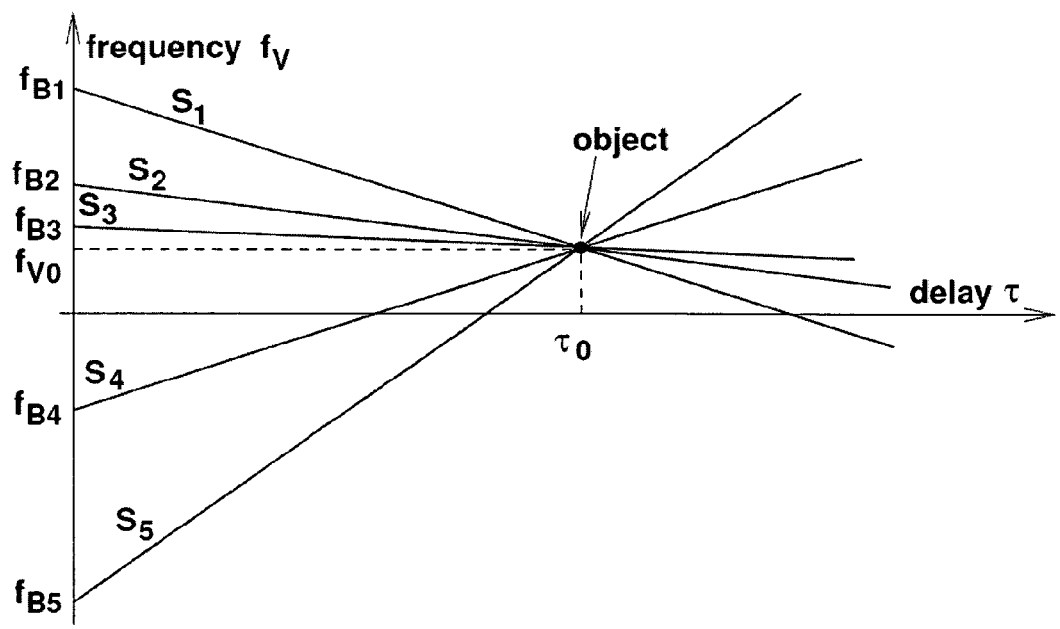
FIG. 4 depicts symbolically a time-frequency plane and an object illuminated with a number of frequency chirps, each having a different slope, according to an embodiment of the invention.

According to an embodiment of the invention, FIG. 4 depicts symbolically a time-frequency plane $(\tau, f_V)$ and an object illuminated with a number of frequency chirps, each having a different slope $S_k$, so that each chirp gives rise to a different beat frequency $f_{Bk}$. It is assumed that the object is characterised by the round-trip delay $\tau_0$ and the Doppler frequency $f_{V0}$.

Assume that an object with unknown range and unknown velocity has been illuminated by a plurality of K frequency chirps, each chirp having slope $S_k$. Then, the resulting K beat frequencies $f_{Bk}$ will define K lines $$f_V = S_k \tau + f_{Bk}, k=1,2,\ldots,K.$$

In the following each of such lines will be referred to as an isobeat line.

In an ideal case of perfect frequency measurements, all K isobeat lines will intersect at a single point $(\tau_0, f_{V0})$, indicative of the round-trip delay $\tau_0$ and Doppler frequency $f_{V0}$ of the object. Therefore, both the range and the radial velocity can be determined uniquely from beat frequencies obtained in response to at least two interrogating frequency chirps with different slopes.

In the presence of noise and interference, beat frequency measurements cannot be perfect, and the resulting isobeat lines will be shifted in a random fashion from their nominal positions. When more than just two perturbed isobeat lines are used for range and velocity determination, the number of all line intersections will always be greater than one, and less than or equal to $K(K-1)/2$, where K is the number of isobeat lines. For example, when K=8, the number of all possible intersection points, hence potential solutions, is equal to 28.

For the purpose of efficient computations and numerical stability, it is convenient to introduce the notion of a unit slope. First, a mean slope $\overline{S}_K$, is calculated, for example, as the geometric mean of a plurality of K employed slopes, hence $$\overline{S}_K = \sqrt[K]{|S_1| \cdot |S_2| \cdot \ldots \cdot |S_K|}.$$

Then, the above mean slope will become a unit slope, and will be used for normalizing all the slopes. Alternative methods for calculating the mean slope $\overline{S}_k$ can also be used. For example, the arithmetic mean could be calculated and used for normalizing all the slopes.

For example, suppose that the mean slope has been found to be equal to 50 MHz/ms (or 50 kHz/μs). Assume that a convenient frequency unit to express observed frequencies is one kilohertz. Then, the mean slope of 50 kHz/μs will represent a unit slope, if the time delay of 1 μs is made equal to 50 'new' time units in a properly scaled time-frequency plane. Therefore, one 'new' time unit must be equal to 20 ns, since 1 μs/50=20 ns. Consequently, the isobeat line of unit slope will make an inclination (acute) angle of 45 degrees with the time delay axis $\tau$, and the same angle of 45 degrees with the frequency axis $f_V$.

In accordance with an embodiment of the invention, a plurality of employed frequency chirps, each chirp having normalized slope $S_k$, can be characterized by the following three parameters $$G_K = \sum_{k=1}^{K} \frac{S_k^2}{1+S_k^2}, \quad H_K = \sum_{k=1}^{K} \frac{1}{1+S_k^2}, \quad P_K = \sum_{k=1}^{K} \frac{S_k}{1+S_k^2}.$$

It is obvious to the skilled person that different parameters can be defined and that modifications of the above equations can be used in accordance with the invention.

It is important to note that for a predetermined plurality of frequency chirps, the above parameters will not depend on the order in which the chirps are actually transmitted in a composite illuminating waveform. Therefore, if the slopes are pre-defined, those three parameters can be calculated and stored prior to measurements, thereby improving computation efficiency even further.

In accordance with an embodiment of the invention, all K measured beat frequencies $f_{Bk}$, each frequency obtained in response to a respective chirp with normalized slope $S_k$, are utilized to determine the two following quantities $$I_K = -\sum_{k=1}^{K} \frac{f_{Bk} \cdot S_k}{1+S_k^2}, \quad Q_K = \sum_{k=1}^{K} \frac{f_{Bk}}{1+S_k^2}.$$

The above two quantities will encapsulate all information provided by the process of interrogating a region of interest with a composite illuminating waveform.

It is obvious to the skilled person that different quantities can be defined and that modifications of the above equations can be used in accordance with the invention.

In accordance with an embodiment of the invention, the round-trip delay $\tau_0$ and/or the Doppler frequency $f_{V0}$, indicative, respectively, of the range $R_0$ and velocity $V_0$ of a detected object, can be determined from the two general equations $$\tilde{\tau}_0 = \frac{H_K \cdot I_K + P_K \cdot Q_K}{G_K \cdot H_K - P_K^2}, \quad \tilde{f}_{V0} = \frac{G_K \cdot Q_K + P_K \cdot I_K}{G_K \cdot H_K - P_K^2}.$$

It is obvious to the skilled person that modifications of the above equations can be used in accordance with the invention.

It should be noted that for a predetermined plurality of chirps, the common denominator: $G_K \cdot H_K - P_K^2$, depends only on the normalized slope $S_k$ values and not on the order in which the chirps are transmitted in a composite illuminating waveform. Therefore, the value of the denominator can be calculated and stored prior to measurements.

In accordance with an embodiment of the invention, the calculations necessary to determine delay and/or Doppler frequency are significantly simplified, if the normalized slopes $S_k$ of a plurality of K employed frequency chirps are so selected as to satisfy the condition $$P_K = \sum_{k=1}^{K} \frac{S_k}{1+S_k^2} = 0,$$

i.e., to decouple time-delay estimates from Doppler-frequency estimates.

When such decoupling has been achieved, the round-trip delay $\tau_0$ and the Doppler frequency $f_{V0}$ can be estimated from two simplified equations $$\tilde{\tau}_0 = \frac{I_K}{G_K}, \quad \tilde{f}_{V0} = \frac{Q_K}{H_K}.$$

As noted above, for a predetermined plurality of frequency chirps, the parameters, $G_K$ and $H_K$, are independent of the order in which the chirps are actually transmitted; hence, those two parameters can be calculated and stored prior to measurements.

The two simplified equations can be expressed in the equivalent forms $$\tilde{\tau}_0 = \sum_{k=1}^{K} \left[ g_k \cdot \left( -\frac{f_{Bk}}{S_k} \right) \right] / \left( \sum_{k=1}^{K} g_k \right), \text{ where } g_k = \frac{S_k^2}{1+S_k^2}$$

$$\tilde{f}_{V0} = \sum_{k=1}^{K} (h_k \cdot f_{Bk}) / \left( \sum_{k=1}^{K} h_k \right), \text{ where } h_k = \frac{1}{1+S_k^2}.$$

The time-delay estimate $\tilde{\tau}_0$ is a weighted average of individual delay components, $(-f_{Bk}/S_k)$. The weight function, $S_k^2/(1+S_k^2)$, indicates that a relative contribution made by a delay component is greater, if the corresponding chirp has a more steep slope $|S_k|$.

The Doppler-frequency estimate $\tilde{f}_{V0}$ is also a weighted average of observed beat frequencies $f_{Bk}$; the weight function, $1/(1+S_k^2)$, indicates that a relative contribution made by an observed beat frequency $f_{Bk}$ is greater, when the corresponding chirp has a less steep slope $|S_k|$.

Therefore, for precise estimation of both time delay and Doppler frequency, a composite waveform should comprise frequency chirps having slopes $|S_k|$ with very large and very small values, suitably chosen from a range of available slopes.

In order to achieve estimate decoupling, i.e., to make the parameter $P_k$ equal to zero, $K^+$ positive slopes, $S_i > 0$, $i = 1, 2, \ldots, K^+$, and $K^-$ negative slopes, $S_j > 0$, $j = 1, 2, \ldots, K^-$, should be so selected as to satisfy the following condition $$\sum_{i=1}^{K^+} \frac{S_i}{1+S_i^2} = -\sum_{j=1}^{K^-} \frac{S_j}{1+S_j^2}, \text{ where } K^+ + K^- = K.$$

For waveform design purposes, it is helpful to view the values $S_k/(1+S_k^2)$ as samples of a continuous 'envelope' function $$f(S) = \frac{S}{1+S^2}$$

taken at discrete points $S_k$. Accordingly, the sampling points (the slopes) should be so chosen as to obtain the same absolute value of two sums of samples: one, for positive, and another one for negative slope values.

Figure 5:
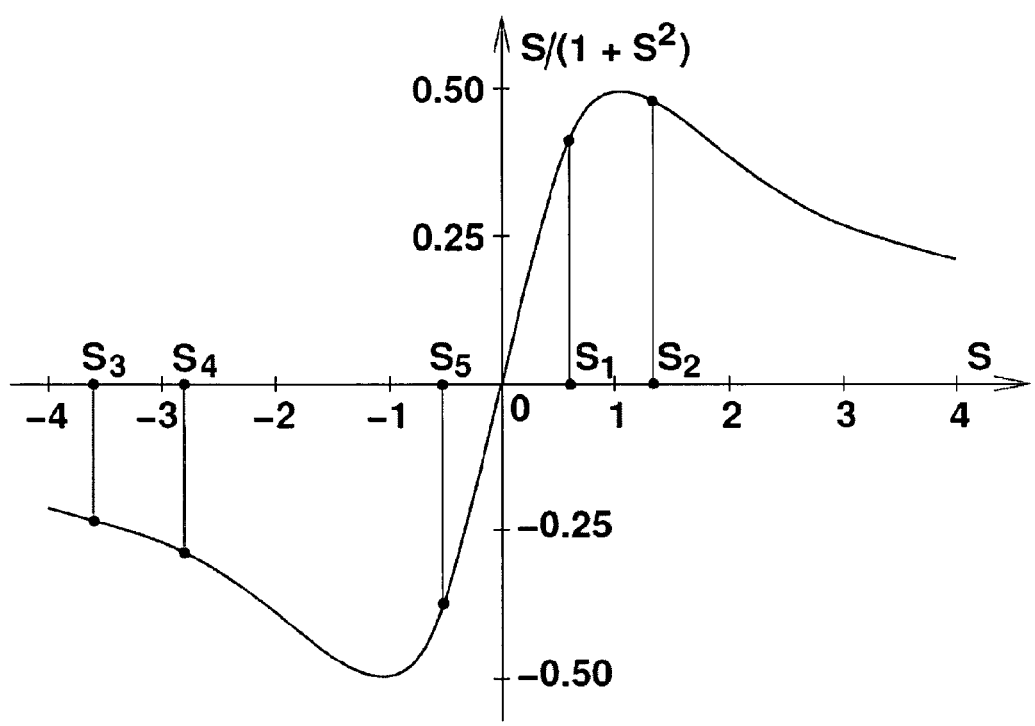
FIG. 5 illustrates schematically an example of selecting the slope values to achieve estimate decoupling according to an embodiment of the invention.

FIG. 5 illustrates schematically an example of selecting the slope values in such a way as to achieve estimate decoupling. In this case, samples taken at points $S_1$ and $S_2$, and those taken at points $S_3$, $S_4$ and $S_5$ will all sum to zero.

According to an embodiment of the invention, estimate decoupling is achieved by employing a plurality of K frequency chirps that consists exclusively of (K/2) chirp pairs, and each pair comprises chirps with opposite slopes, hence $$S_i = -S_j, i,j = 1, 2, \ldots, K/2.$$

For such a slope selection, the parameter $P_K$ is always equal to zero by construction, as can be deduced by analyzing the definition of parameter $P_K$ or by inspecting FIG. 5.

According to an embodiment of the invention, a plurality of K frequency chirps consists exclusively of (K/2) chirp pairs, and each pair comprises chirps with inverse (normalized) slopes $$|S_i| = 1/|S_j|, i,j = 1, 2, \ldots, K/2,$$

the two parameters $G_K$ and $H_K$ will assume the same numerical values, $G_K = H_K = K/2$.

In accordance with another embodiment of the invention, the task of processing beat frequencies is further simplified, by utilising an illuminating waveform that consists exclusively of K/4 chirp quadruples, and each quadruple comprises chirps with opposite as well as inverse slopes.

In such a case, the round-trip delay $\tau_0$ and the Doppler frequency $f_{V0}$ can be determined by $$\tilde{\tau}_0 = -\frac{2}{K} \sum_{k=1}^{K} \frac{f_{Bk} \cdot S_k}{1+S_k^2}, \quad \tilde{f}_{V0} = \frac{2}{K} \sum_{k=1}^{K} \frac{f_{Bk}}{1+S_k^2}.$$

It is important to note that a unit slope is also its own inverse. Therefore, a single pair of chirps with normalized slopes of −1 and +1 comprises chirps with the slopes that are both opposite and inverse at the same time. This unique chirp doublet can be used jointly with chirp quadruples to construct advantageous illuminating waveforms comprising K=2(L+1) chirps, where L≥0 is an integer.

Often, because of operational requirements and technical limitations, the ratio Z of the maximum slope to the minimum slope $$Z=|S|_{max}/|S|_{min}>1$$

has to be fixed. In such a case, an advantageous chirp quadruple will have the following (normalized) slopes $$-\sqrt{Z},-1/\sqrt{Z},1/\sqrt{Z},\sqrt{Z}.$$

In the following, this specific optimal chirp arrangement will be referred to as a quadrichirp.

In general, a composite illuminating waveform may comprise a plurality of chirps with positive as well as negative slopes. Consequently, those slopes will have to be distributed in some optimum fashion over their respective intervals:

$$(|S|_{min},|S|_{max}) \text{ and } (-|S|_{max},-|S|_{min}).$$

In accordance with an embodiment of the invention, an advantageous slope distribution will be obtained when inclination angles, $\tan^{-1}(S_k)$ of isobeat lines generated by the slopes, $S_k$, are distributed in a substantially uniform manner over their respective intervals $$(\tan^{-1}(|S|_{min}),\tan^{-1}(|S|_{max})) \text{ and } (-\tan^{-1}(|S|_{max}),-\tan^{-1}(|S|_{min})).$$

Such a design will result in a slope pattern with maximum entropy that will provide a composite illuminating waveform with an enhanced resistance to jamming and mutual interference.

As will have become apparent from the above description of embodiments of the invention, it is preferred that a transmitted signal comprises a number of portions K with K>=4, especially if the linear frequency variation has a different slope within each portion.

An illustrative example is presented below to facilitate the understanding of the steps involved in the design of advantageous illuminating waveforms, constructed in accordance with an embodiment of the invention.

EXAMPLE 1

Optimal Chirp Sextet

Assume that it is required to design an advantageous illuminating waveform comprising six frequency chirps. Suppose also that the ratio Z of the maximum slope to the minimum one is given as a design parameter.

Since six frequency chirps are required, the waveform can be constructed from one chirp quadruple and one chirp doublet. The chirp quadruple is the following quadrichirp $$-Z^{1/2},-Z^{-1/2},Z^{-1/2},Z^{1/2}.$$

When a chirp doublet has been added, the following slope pattern is obtained $$-Z^{1/2},-1,-Z^{-1/2},Z^{-1/2},1,Z^{1/2}.$$

For example, when Z=3, the above slope pattern assumes the form $$-\sqrt{3},-1,-\sqrt{3}/3,\sqrt{3}/3,1,\sqrt{3}.$$

The inclination angles are the inverse tangents of these values.

This slope pattern will therefore generate six isobeat lines with the inclination angles $$60°,-45°,-30°,30°,45°,60°.$$

Although the inclination angles have been expressed in degrees, they could alternatively have been expressed in radians or any other angular measure.

If the mean slope is assumed to be, say, 50 MHz/ms, then a composite illuminating waveform employing the optimal chirp sextet, with Z=3, will be composed of six frequency chirps with the following approximate slope values (expressed in MHz/ms)

$$-86.6,-50.0,-28.9,28.9,50.0,86.6.$$

Each of these values has been calculated by the product of the mean slope and each value of the slope pattern; or, alternatively, the product of the mean slope and the tangent of the inclination angle.

Another illustrative example is presented below to facilitate the understanding of the steps involved in the design of advantageous illuminating waveforms, constructed in accordance with an embodiment of the invention.

EXAMPLE 2

Optimal Chirp Octet

Assume that it is required to design an advantageous illuminating waveform comprising eight frequency chirps. Suppose also that the ratio Z of the maximum slope to the minimum one is given as a design parameter.

Since eight frequency chirps are required, the waveform can be constructed from two chirp quadruples. A first quadruple is the quadrichirp $$-Z^{1/2},-Z^{-1/2},Z^{-1/2},Z^{1/2}.$$

Although a second quadruple may be just a replica of the above quadrichirp, a second quadruple is advantageously constructed so as to obtain a uniform spread of the inclination angles of the isobeat lines.

Accordingly, the sector defined by the inclination angles $$(\tan^{-1}\sqrt{1/Z},\tan^{-1}\sqrt{Z})=(\pi/2-\tan^{-1}\sqrt{Z},\tan^{-1}\sqrt{Z})$$

has to be divided into three equal parts to determine the inclination angles of the two pairs of intermediate isobeat lines. Although the inclination angles have been expressed in radians they could alternatively have been expressed in degrees or any other angular measure.

Similarly, the sector defined by the inclination angles $$(\tan^{-1}-\sqrt{Z},\tan^{-1}-\sqrt{1/Z})$$

also has to be divided into three equal parts.

Considering just the first of these sectors; if the limits are $(L_{min}, L_{max})$ then the two intermediate angles that divide the sector into three equal segments are:

$$\frac{(L_{max}-L_{min})}{3}+L_{min}, \text{ and } \frac{2(L_{max}-L_{min})}{3}+L_{min}.$$

Substituting $L_{max}=\tan^{-1}\sqrt{Z}$ and $L_{min}=\pi/2-\tan^{-1}\sqrt{Z}$ into the above equations gives the angles $$\pi/3-(\tfrac{1}{3})\tan^{-1}\sqrt{Z} \text{ and } \pi/6+(\tfrac{1}{3})\tan^{-1}\sqrt{Z}$$

The corresponding angles in the other sector will be the opposite of these values. The slopes of the second quadrichirp are therefore, $$\pm\tan[\pi/3-(\tfrac{1}{3})\tan^{-1}\sqrt{Z}] \text{ and } \pm\tan[\pi/6+(\tfrac{1}{3})\tan^{-1}\sqrt{Z}]$$

For example, when Z=2, the four intermediate slopes will assume the following approximate values $$-1.120, -0.893, 0.893, 1.120$$

Finally, combining the two quadruples yields an optimal octet with approximate slope values $$\pm 0.707, \pm 0.893, \pm 1.120, \pm 1.414.$$

If the mean slope is assumed to be, say, 50 MHz/ms, then an optimum illuminating waveform will comprise frequency chirps with the following approximate slope values (expressed in MHz/ms)

$$\pm 35.4, \pm 44.6, \pm 56.0, \pm 70.7$$

The geometric mean of the determined slopes, $$\sqrt[4]{35.5 \cdot 44.6 \cdot 56.0 \cdot 70.7} \approx 50.00 \text{ MHz/ms}$$

is a high-accuracy approximation of the assumed value of 50 MHz/ms.

Owing to the fact that frequency chirps may be transmitted in time in any suitable order, a single set of slopes can generate a plurality of advantageous illuminating waveforms. Each such waveform will be composed of the same set of frequency chirps, yet each time, the chirps will be transmitted in a different order An advantageous set of chirps, such as chirp sextet or chirp octet, can be used to construct a number of finite composite waveforms, referred to as chirp bursts. In accordance with an embodiment of the invention, during its operation, an automotive radar, for example, will select each time at random, or in any other suitable irregular way, one of the available waveforms and will transmit this waveform as a chirp burst to illuminate the region of interest. Additionally, the time gap between chirp bursts may be constant or it may vary in some regular or irregular fashion.

Since no power is transmitted during the time gap, this interval can be exploited for incorporating a 'listen-only' operating mode, employed to evaluate the level of potential interference produced by other users of the shared frequency band.

Figure 6A:
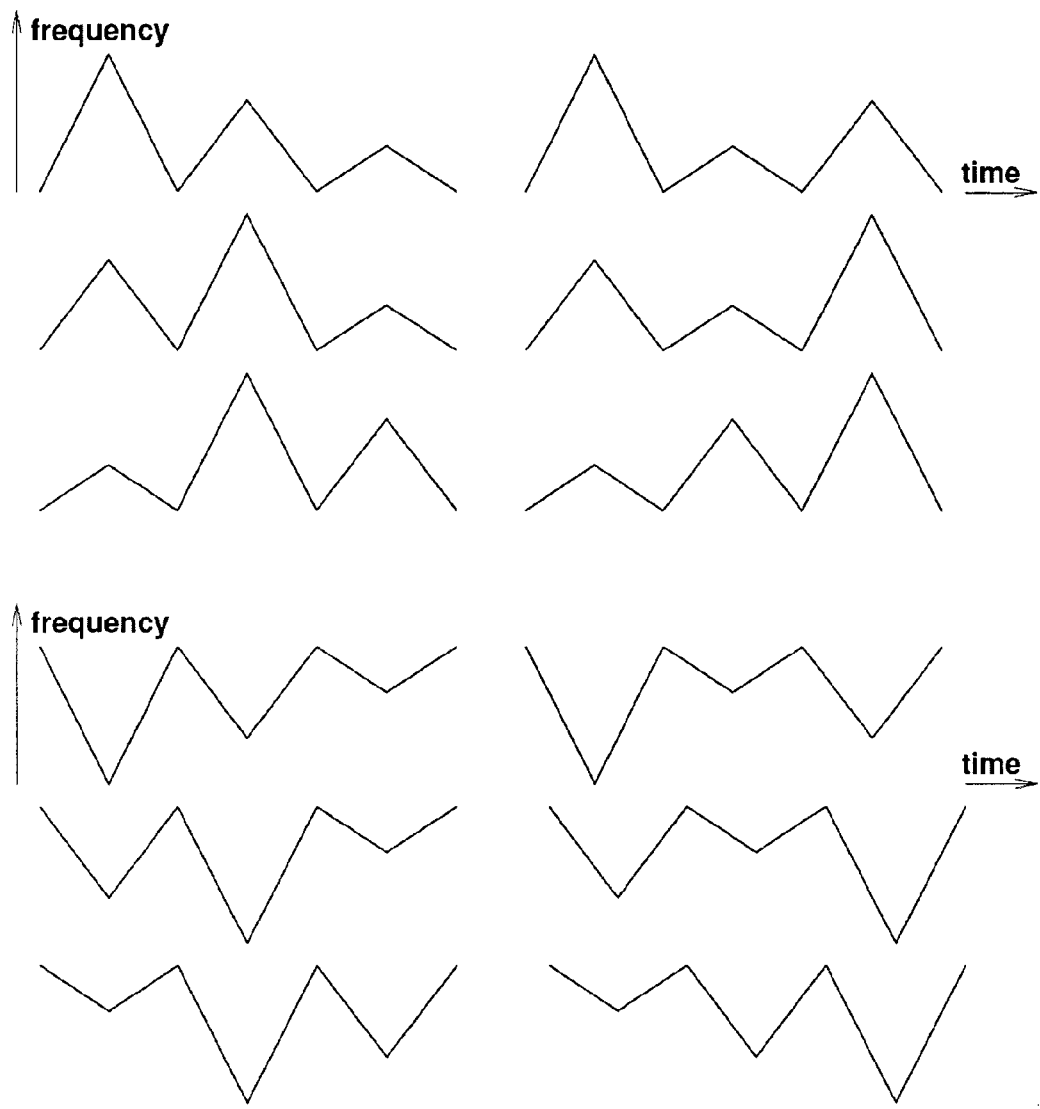
FIG. 6 depicts some selected examples of composite waveforms comprising the same six chirps, yet occurring in a different order according to an embodiment of the invention.
Figure 6B:
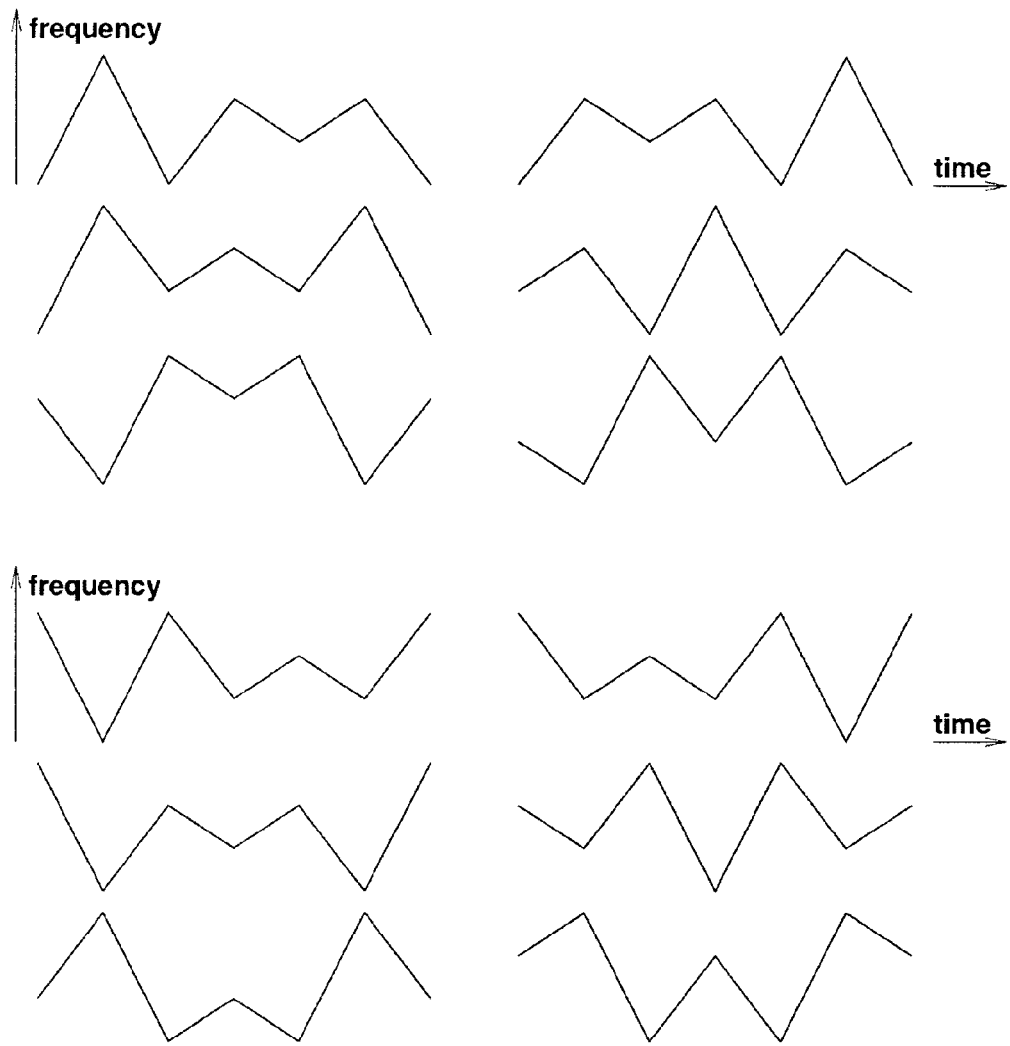
Figure 6C:
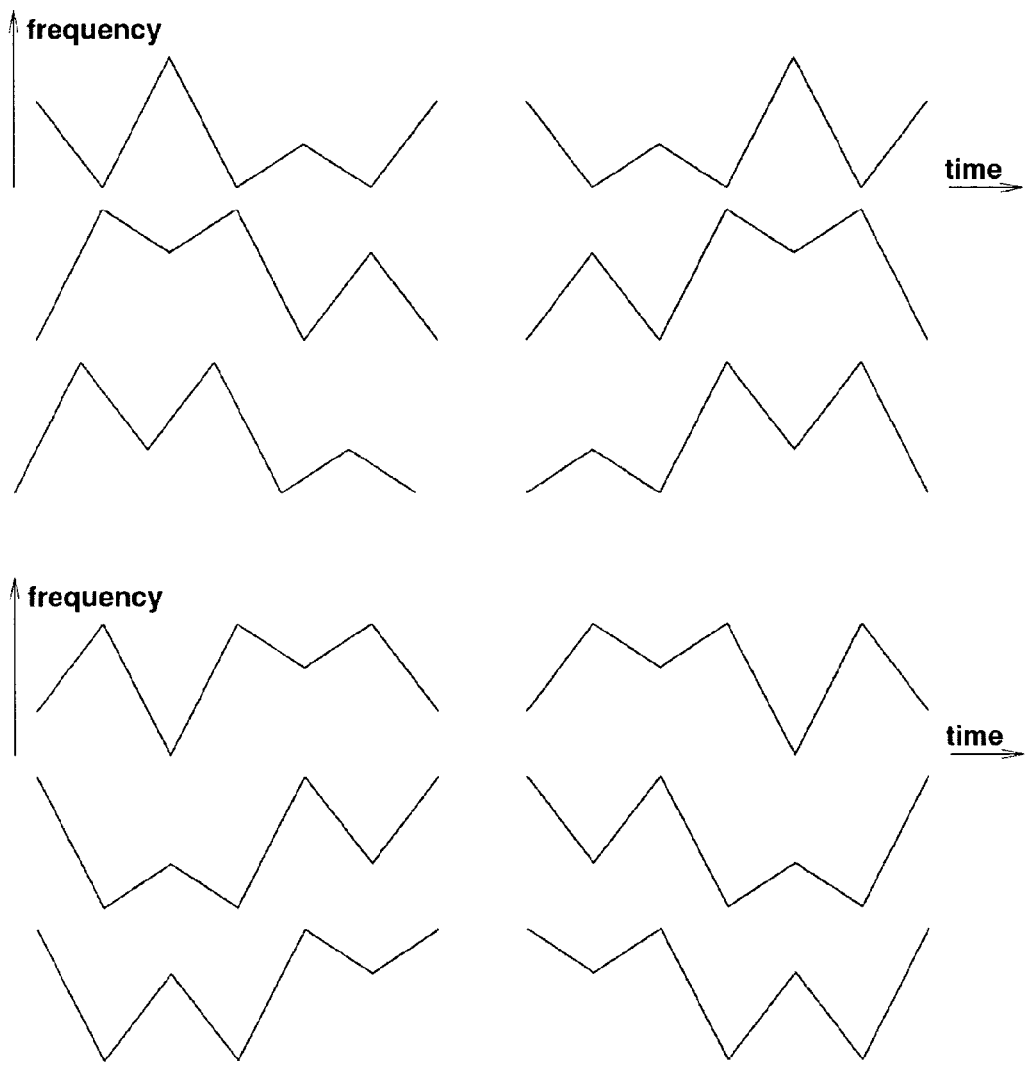

FIG. 6 depicts some selected examples of composite waveforms comprising the same six chirps, yet occurring in a different order. As seen, some waveforms have been obtained from other waveforms by applying the operations of 'time-reversal' and/or 'frequency-reversal'.

Figure 7:
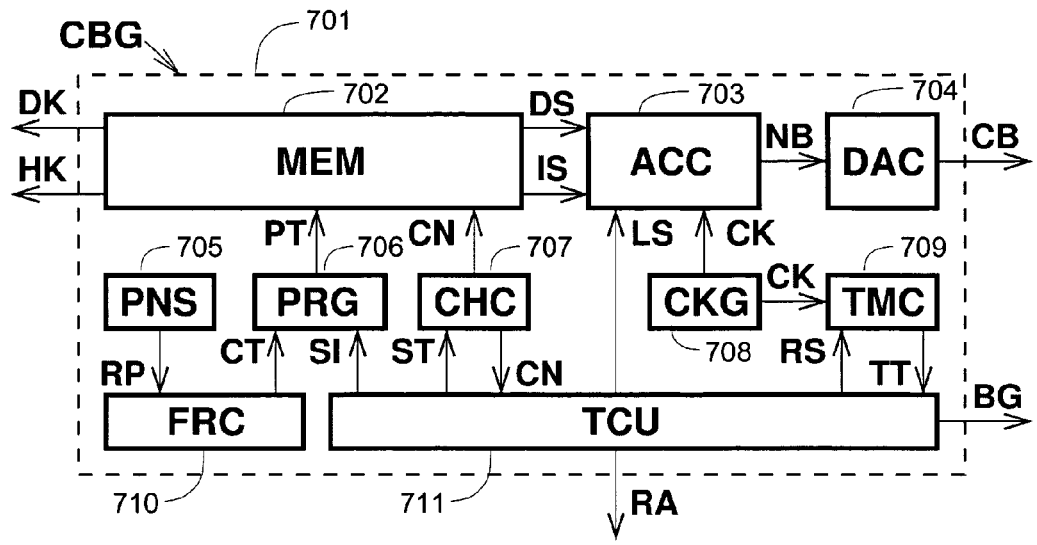
FIG. 7 depicts a functional block diagram of a chirp-burst generator CBG, constructed in accordance with an embodiment of the invention.

An apparatus for generating control signals for a voltage controlled oscillator VCO such that it generates the illuminating waveforms comprised of frequency chirps according to an embodiment of the invention is shown in FIG. 7.

FIG. 7 depicts a functional block diagram of a chirp-burst generator CBG (701), constructed in accordance with an embodiment of the invention. The generator comprises the following blocks:

a timing/control unit TCU (711)
a free-running counter FRC (710)
a physical noise source PNS (705)
a pattern register PRG (706)
a chirp counter CHC (707)
a memory MEM (702)
an accumulator ACC (703)
a clock generator CKG (708)
a time counter TMC (709)
a digital-to-analogue converter DAC (704)

The chirp-burst generator CBG operates as follows. Randomly appearing pulses RP, supplied by a physical noise source PNS, such as Zener diode, drive a free-running counter FRC. The capacity of the counter FRC is equal to the number of different chirp bursts (illuminating waveforms) utilized by the system. The rate of random pulses RP is so high that the counter FRC, while operating cyclically, will overflow a large number of times during the time interval between consecutive chirp bursts. Consequently, the counter states CT observed 'on the fly' at such time intervals will all occur with substantially the same probabilities.

At a time instant determined by a pulse SI, provided by the timing/control unit TCU, a current state CT of the counter FRC is transferred to the pattern register PRG where it is stored and made available at output PT. The output PT constitutes one part of the address used to locate a corresponding storage cell of the memory MEM. The other part, CN, of the combined address (PT, CN) is provided by a chirp counter CHC.

The pulse SI will also switch on the burst gate BG produced by the timing/control unit TCU. As will be explained below, the duration of this gate is equal to the duration of the entire chirp burst. The gate BG may be used by the automotive radar to control the microwave power amplifier or generator.

Pulses SI are generated internally by the timing/control unit TCU at regular or suitably irregular intervals; the time interval determined by those pulses is the sum of the burst duration and the intended time gap between consecutive bursts. The timing/control unit TCU also produces reset pulses RA to be used by a suitable signal processor. Each of the reset pulses occurs prior to the start of each chirp burst.

The output PT selects one of the available chirp bursts to be transmitted, whereas the output CN indicates the actual number of a chirp being generated within this selected burst. For example, if a chirp sextet is employed to construct a plurality of chirp bursts, then there may be available 32 different chirp bursts, and each of those bursts will comprise six chirps. However, in general, chirps appearing at the same positions in different bursts will have different slope values.

Therefore, while the output PT maintains the same value during the selected chirp burst, the output CN assumes integer values that increase successively from one (first chirp of the burst) to K (last chirp of the burst). For example, if a chirp sextet is employed to construct chirp bursts, and burst number seven is to be utilized, then during the entire burst duration, the value of the output PT will be kept constant and equal to seven, whereas output CN will be taking on successively the values: 1, 2, 3, 4, 5, and 6.

Just before the burst starts, the state CN of the chirp counter CHC is set to 'one' by a pulse ST supplied by the timing/control unit TCU. The state CN is increased by one, every time a fresh pulse appears at input ST to indicate the start of a new chirp. Those pulses are generated by the timing/control unit TCU at regular intervals of duration equal to the duration of each chirp of the burst.

The chirp duration is determined by the time counter TMC that is 'counting up' pulses CK supplied by a suitable clock generator CKG. The initial state of the time counter TMC is preset to 'all-zero state' by a signal RS provided by the timing/control unit TCU. When the time counter TMC reaches its maximum capacity, then it:

produces a signal TT
reverts to the 'all-zero state'
starts again 'counting up' clock pulses CK.

The signal TT makes the timing/control unit TCU produce a new pulse ST to increase by one the state CN of the chirp counter CHC. The state CN is monitored by the timing/control unit TCU: when the state ON reaches its maximum value, it means that the last chirp of a selected burst is being generated, and then a new pulse TT obtained from the time counter TMC will define the end of the entire chirp burst. This pulse will also switch off the burst gate EG produced by the timing/ control unit TCU.

At each cell corresponding to a combined address (PT, CN), the memory MEM stores values of the following parameters:
- an initial value IS, corresponding to the start frequency of the burst
- an increment DS, representing the steepness of a chirp slope
- weights, DK and HK, to be sent to a suitable signal processor, such as a beat-frequency processor, to be discussed below.

Just before the start of each burst, the state of the accumulator ACC is preset by the 'load' signal LS to an initial state IS, supplied by the memory MEM. At each clock pulse CK, the accumulator ACC adds to its current state an increment DS provided by the memory MEM. The value of this increment represents the steepness of the slope of a chirp being actually generated and transmitted. Obviously, the increment DS is positive for up-slopes, and negative for down-slopes.

Each state NE of the accumulator ACC is supplied to the digital-to-analogue converter DAC whose voltage output CE is 'tracing' a required frequency-time characteristic of the chirp burst being generated. The signal CB is employed to control a suitable voltage-controlled oscillator.

As will be discussed later, the stored values of the two weights, DK and HK, are equal to $$DK = \frac{-S_k}{1+S_k^2} \text{ and } HK = \frac{1}{1+S_k^2},$$

where $S_k$ is the slope of a k-th chirp occurring in the burst.

An example is given below to facilitate the understanding of the process of generating chirp bursts.

Figure 8:
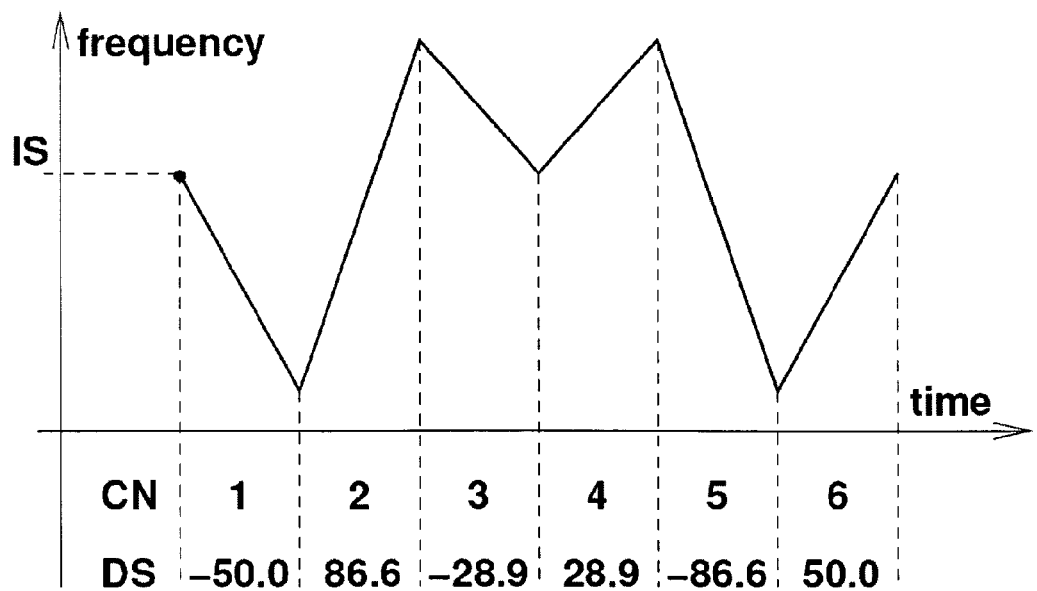
FIG. 8 shows an example of a frequency-time characteristic of a selected waveform comprising six frequency chirps according to an embodiment of the invention.

Suppose that it is required to generate a chirp burst based on an optimal chirp sextet discussed in Example 1. Assume that the frequency-time characteristic of a selected chirp burst is of the form depicted in FIG. 8.

The burst comprises six chirps; the chirps are numbered as indicated by the successive states CN of the chirp counter CHC. The approximate slope values, expressed in MHz/ms, are given in Example 1 as follows:

±28.9, ±50.0, ±86.6

Assume also that the duration of each chirp is 4 ms. For example, the required time interval can be determined by the time counter TMC, counting up clock pulses CK produced by a 1-MHz clock generator CKG. The initial state IS will represent the value of 4 ms·50 MHz/ms=200 MHz; the increments DS corresponding to the respective states ON of the chirp counter CHO will represent the following slopes:

| CN | 1 | 2 | 3 | 4 | 5 | 6 |
|---|---|---|---|---|---|---|
| DS [kHz/µs] | −50.0 | +86.6 | −28.9 | +28.9 | −86.6 | +50.0 |

Alternative designs of chirp-burst generator are also possible. Such designs may, for example, output the values of the slopes ($S_k$) as well as, or instead of, functions of the values of the slopes.

A beat frequency processor BFP is a device that is operable to receive observed beat frequencies $f_{Bk}$ and corresponding information of slopes, or functions of slopes. It uses this information to calculate and output an estimate of a range and/or velocity.

Figure 9:
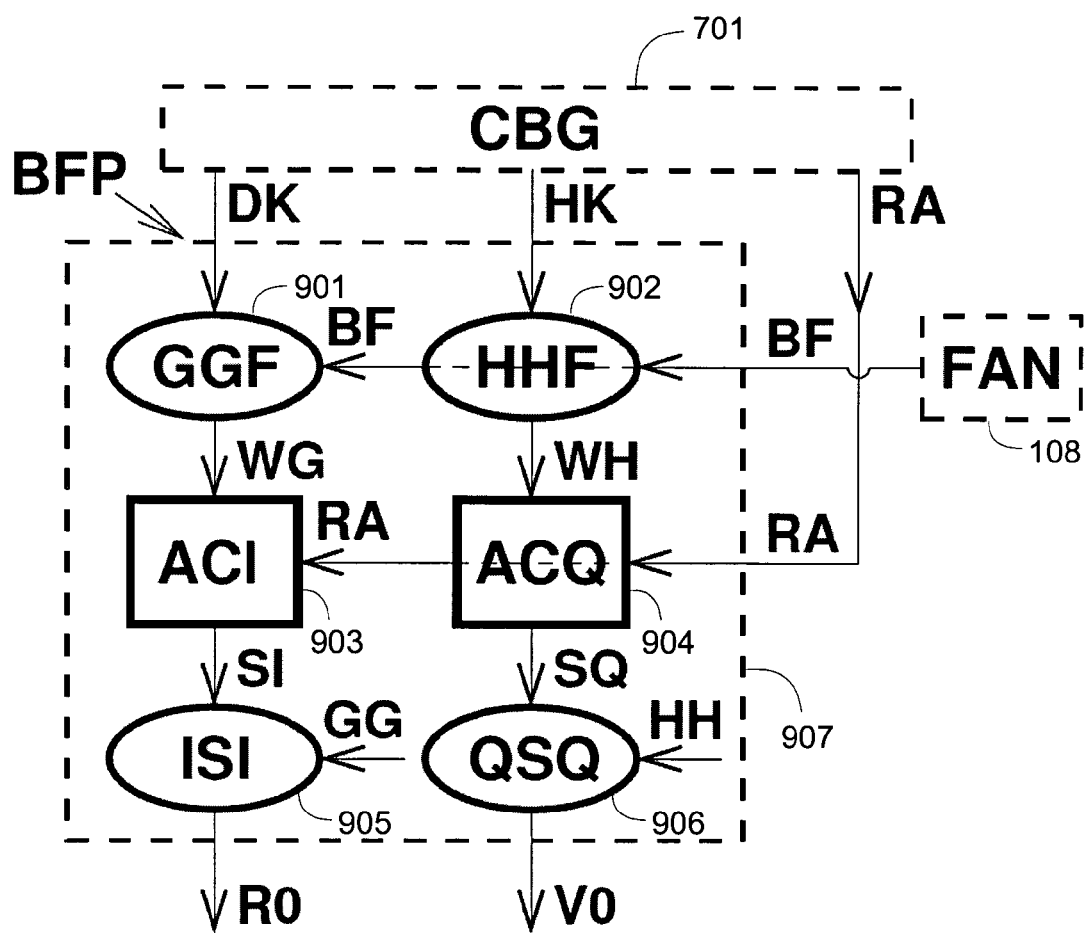
FIG. 9 is a functional block diagram of a beat frequency processor BFP, constructed in accordance with an embodiment of the invention.

FIG. 9 is a functional block diagram of a beat frequency processor BFP, constructed in accordance with an embodiment of the invention. The processor BFP implements the two equations $$\tilde{\tau}_0 = \sum_{k=1}^{K} \left[ g_k \cdot \left( -\frac{f_{Bk}}{S_k} \right) \right] / \left( \sum_{k=1}^{K} g_k \right), \text{ where } g_k = \frac{S_k^2}{1+S_k^2}$$

$$\tilde{f}_{V0} = \sum_{k=1}^{K} (h_k \cdot f_{Bk}) / \left( \sum_{k=1}^{K} h_k \right), \text{ where } h_k = \frac{1}{1+S_k^2}$$

to calculate the round-trip delay $\tau_0$ and the Doppler frequency $f_{V0}$. The values of delay $\tau_0$ and the Doppler frequency $f_{V0}$ are then converted into range and radial velocity of a detected object.

The beat frequency processor BFP 907 comprises two multipliers GGF 901 and HHF 902, two accumulators ACI 903 and ACQ 904, and two scaling circuits ISI 905 and QSQ 906. Each value BF of a beat frequency $f_{Bk}$, provided by a suitable frequency analyzer FAN 108, is applied in parallel to the two multipliers GGF and HHF, whose other inputs are driven, respectively, by the weights DK and HK, supplied by a chirp-burst generator CBG 701 (see also FIG. 7).

The values of the two weights, are given by $$DK = \frac{-S_k}{1+S_k^2} \text{ and } HK = \frac{1}{1+S_k^2}$$

where $S_k$ is the slope of a k-th chirp occurring in the burst.

The multipliers outputs, WG and WH, are numerical representations of the following products $$WG = BF \cdot DK = f_{Bk} \cdot \left( \frac{-S_k}{1+S_k^2} \right)$$

$$WH = BF \cdot HK = f_{Bk} \cdot \left( \frac{1}{1+S_k^2} \right).$$

Those products are applied to respective accumulators, ACI and ACQ, to determine the sums, SI and SQ, representing the quantities $$SI = \sum_{k=1}^{K} \frac{-S_k \cdot f_{Bk}}{1+S_k^2} \text{ and } SQ = \sum_{k=1}^{K} \frac{f_{Bk}}{1+S_k^2}.$$

The values, SI and SQ, supplied by the accumulators, ACI and ACQ, are then suitably scaled to produce the range R0 and velocity V0 of a detected object.

The scaling factors, GG and HH, can be expressed as $$GG = TR \bigg/ \left( \sum_{k=1}^{K} \frac{S_k^2}{1+S_k^2} \right) \text{ and } HH = FV \bigg/ \left( \sum_{k=1}^{K} \frac{1}{1+S_k^2} \right)$$

where the coefficients, TR and FV, are used to convert, respectively, delay $\tau_0$ into range R0, and Doppler frequency $f_{V0}$ into velocity V0.

When the slope pattern comprises chirp quadruples and/or a chirp doublet, the above scaling factors will assume the following simplified forms $GG=2 \cdot TR/K$ and $HH=2 \cdot FV/K$.

The beat frequency processor BFP operates as follows. First, the states of the two accumulators, ACI and ACQ, are reset to zero by a signal RA obtained from the chirp-burst generator CBG. Then, successive product pairs, WG and WH, each pair being determined for a respective chirp slope $S_k$ and beat frequency $f_{Bk}$, are being accumulated to produce the respective outputs SI and SQ. Finally, those outputs are scaled as follows $R0=SI \cdot GG$ and $V0=SQ \cdot HH$ to provide estimates of the range R0 and the velocity V0 of a detected object.

Alternative designs of beat frequency processor are also possible. These would be similarly operable to receive values of the slopes, or functions of the values of the slopes, from a chirp burst generator and observed beat frequencies from a frequency analyzer.

However, the processor would not be restricted to implementing the equations given above and could alternatively implement other equations.

For example, the beat frequency processor could calculate the round-trip delay $\tau_0$ and/or the Doppler frequency $f_{V0}$ from the equations given above.

Such a beat frequency processor could have an efficient bespoke design or be implemented by a DSP.

Figure 1:
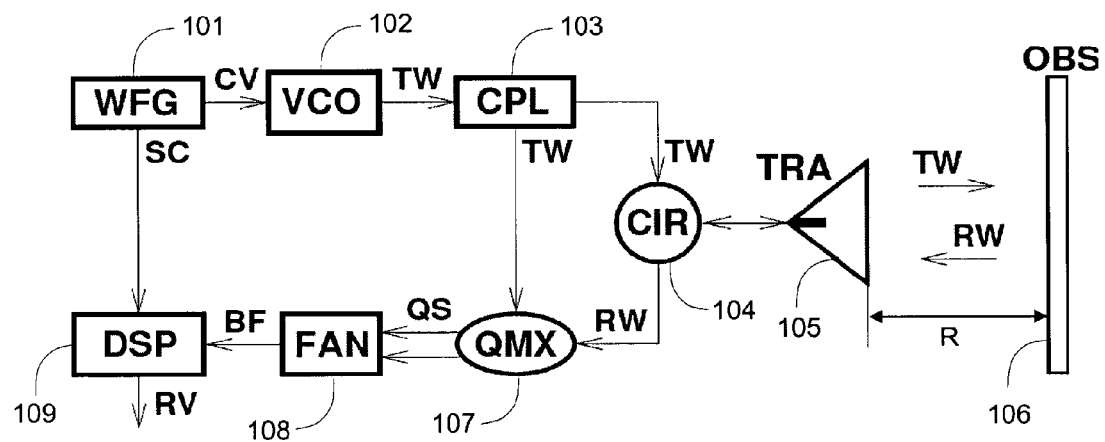
FIG. 1 is a simplified functional block diagram of conventional FMCW automotive radar.
Figure 2:
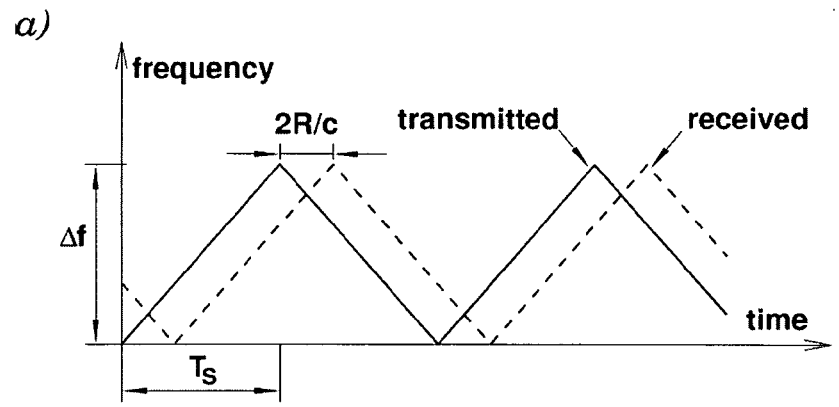
FIG. 2a shows schematically linear frequency variations of the transmitted and the received waveforms, and also the resulting beat frequency.
FIG. 2b depicts schematically linear frequency variations of the transmitted and the received waveforms, and also the resulting beat frequency in the case, when a received waveform is delayed and Doppler-shifted with respect to the transmitted waveform.
Figure 2:
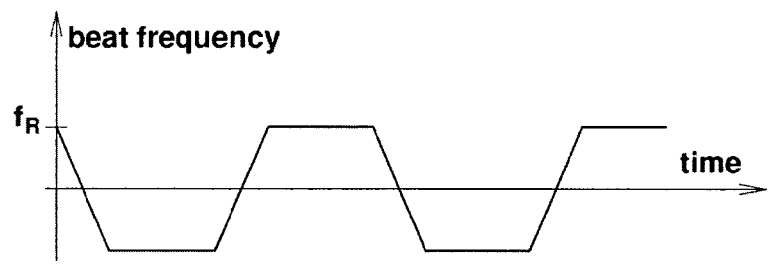
Figure 2:
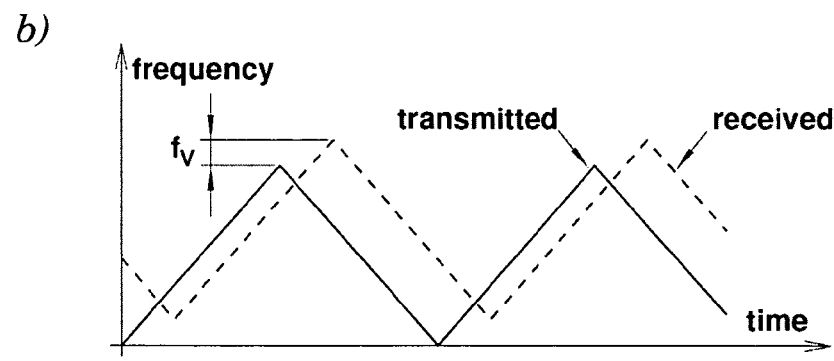
Figure 2:
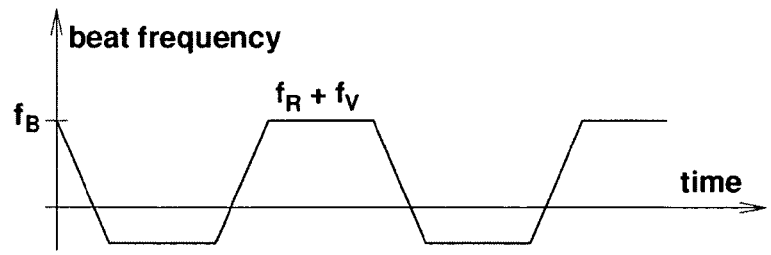
Figure 10:
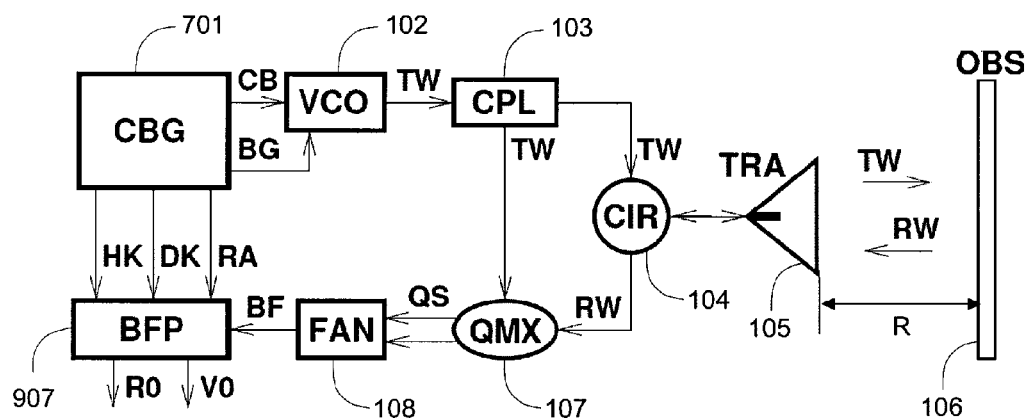
FIG. 10 is a functional block diagram of an improved automotive FMCW radar, constructed in accordance with an embodiment of the invention.

FIG. 10 is a functional block diagram of automotive FMCW radar, constructed in accordance with an embodiment of the invention. The system is a modification of a conventional arrangement depicted in FIG. 1 and reference is made to the description of FIG. 1. As seen, the triangular waveform generator WFG of FIG. 1 has been replaced by the chirp burst generator CBG 701, whereas the digital signal processor DSP of FIG. 1 has been replaced by the beat frequency processor PIP 907 according to the invention. As shown in FIG. 10 values HK, DK and RA as discussed above are provided from the chirp burst generator CBG 701 to the beat frequency processor BFP 907 while the beat frequencies $f_{Bk}$ are provided from frequency analyzer FAN 108.

Alternatively, the slopes or normalized slopes $S_k$ of the signal portions could be provided from the chirp burst generator CBG 701 to the beat frequency processor BFP 907 instead of the values HK, DK and RA shown in FIG. 10.

A computer simulation study has been conducted to evaluate the performance of a beat frequency processor BFP, constructed in accordance with an embodiment of the invention. It is assumed that automotive radar is operating in a 77-GHz frequency band and it employs an optimal chirp octet, as constructed in an earlier example. It is also assumed that an object, appearing at range 60 m, is approaching the radar system with a radial velocity of 110 km/h.

In an ideal case, with no noise or interference present, the eight beat frequencies $f_{Bk}$, corresponding to chirps with slopes $S_k$, will have the following nominal values

| $S_k$ [MHz/ms] | −70.7 | +70.7 | −56.0 | +56.0 | −44.6 | +44.6 | −35.4 | +35.4 |
|---|---|---|---|---|---|---|---|---|
| $f_{Bk}$ [kHz] | +43.5 | −12.9 | +37.7 | −7.1 | +33.1 | −2.5 | +29.5 | +1.1 |

Figure 11:
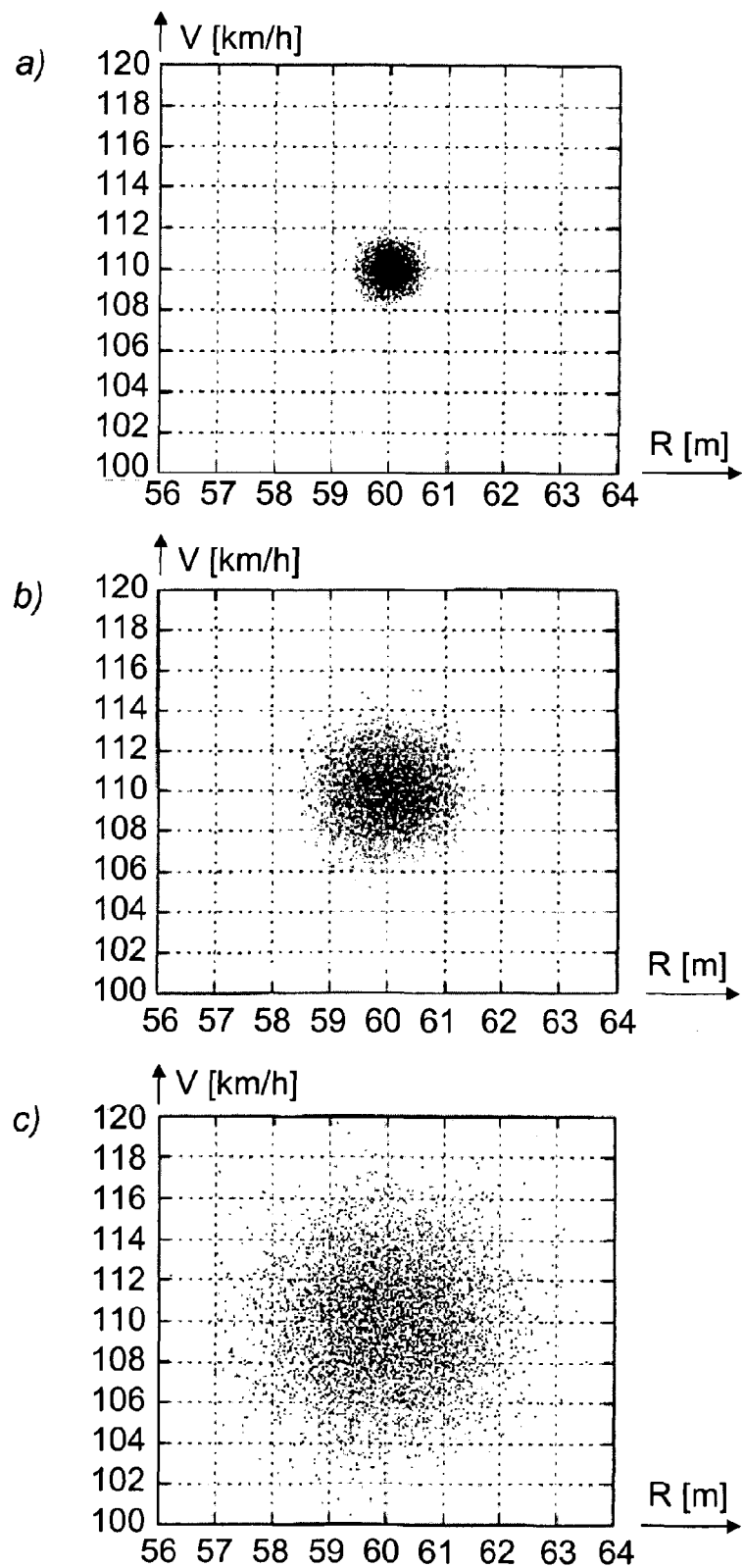
FIG. 11a depicts a scatter diagram of 5000 individual outputs of a signal processor when each of eight beat frequencies is corrupted with a Gaussian random disturbance with zero mean and standard deviation of 0.2 kHz.
FIG. 11b depicts a scatter diagram of 5000 individual outputs of a signal processor when each of eight beat frequencies is corrupted with a Gaussian random disturbance with zero mean and standard deviation of 0.5 kHz.
FIG. 11c depicts a scatter diagram of 5000 individual outputs of a signal processor when each of eight beat frequencies is corrupted with a Gaussian random disturbance with zero mean and standard deviation of 1 kHz.

FIG. 11a depicts a scatter diagram of 5000 individual outputs of a signal processor that processes eight observed beat frequencies. In this case, each beat frequency is corrupted with a Gaussian random disturbance with zero mean and standard deviation of 0.2 kHz.

FIG. 11b and FIG. 11c are scatter diagrams obtained for the same object when each of eight beat frequencies is corrupted with a Gaussian disturbance with zero mean and standard deviation of, respectively, 0.5 kHz and 1 kHz. As expected, errors of the range and velocity estimates are gradually increasing with a rising level of interference.

In most practical applications, some performance degradation due to low or moderate interference level can be tolerated. However, when automotive radar is operating in a dense-signal multiuser environment, there is a high probability that a catastrophic interference may occur due to some interference of impulsive nature. In such a case, at least one of the observed beat frequencies will become a 'rogue frequency', i.e., it will assume a value not related in any way to the range or velocity of a detected object.

Figure 12:
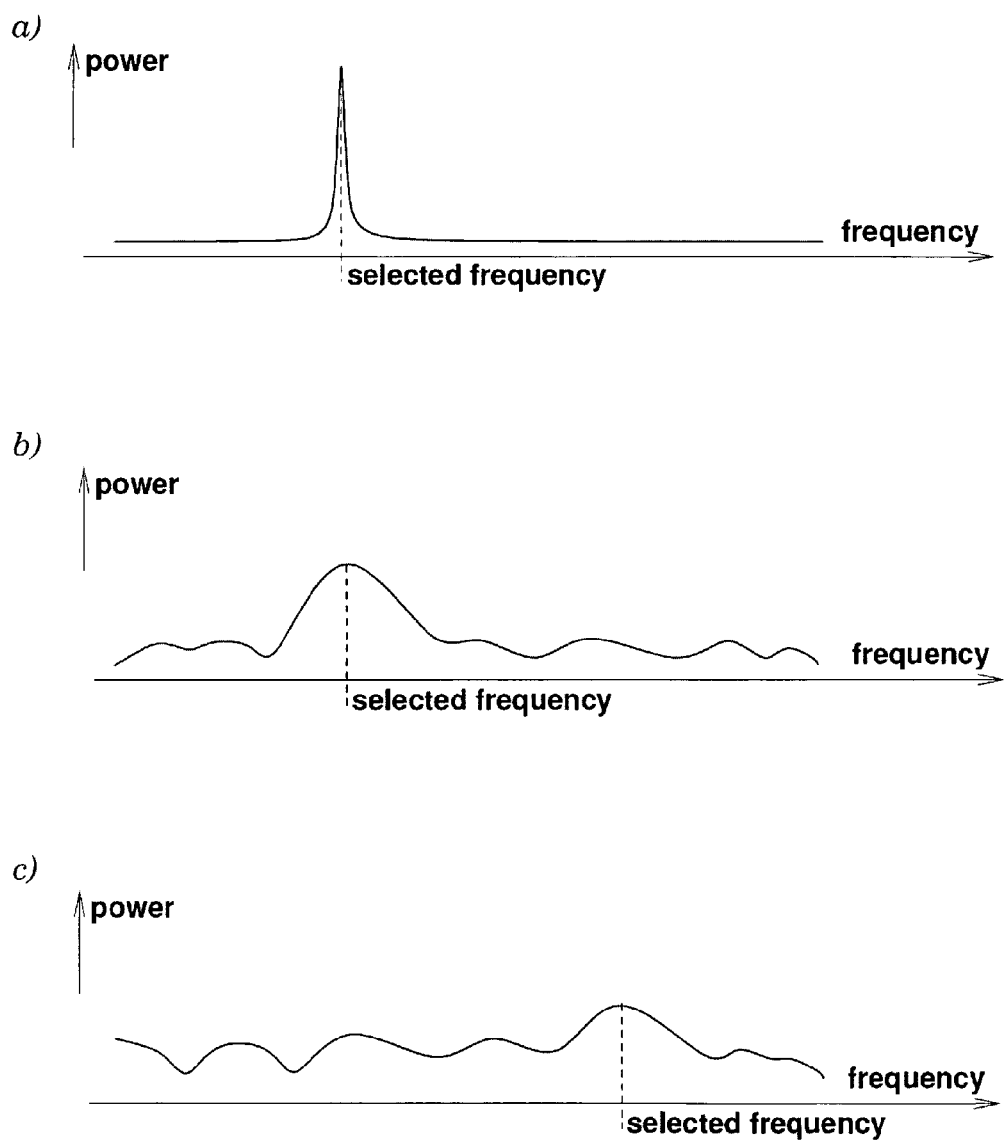
FIG. 12 depicts schematically an example of a mechanism that may give rise to catastrophic interference.

One mechanism that may give rise to catastrophic interference is depicted schematically in FIG. 12. When there is no noise or interference, the beat frequency can be determined with high accuracy by observing the maximum of received power as a function of beat frequency, as shown in FIG. 12a. When the level of noise and interference is increasing, it is still possible to determine the power maximum. However, because now the maximum is not well defined, estimation errors may occur—this case is depicted in FIG. 12b. In a situation of catastrophic interference, shown in FIG. 12c, a high level of noise and interference makes the power maximum appear at a beat frequency shifted significantly with respect to its true value.

Figure 13:
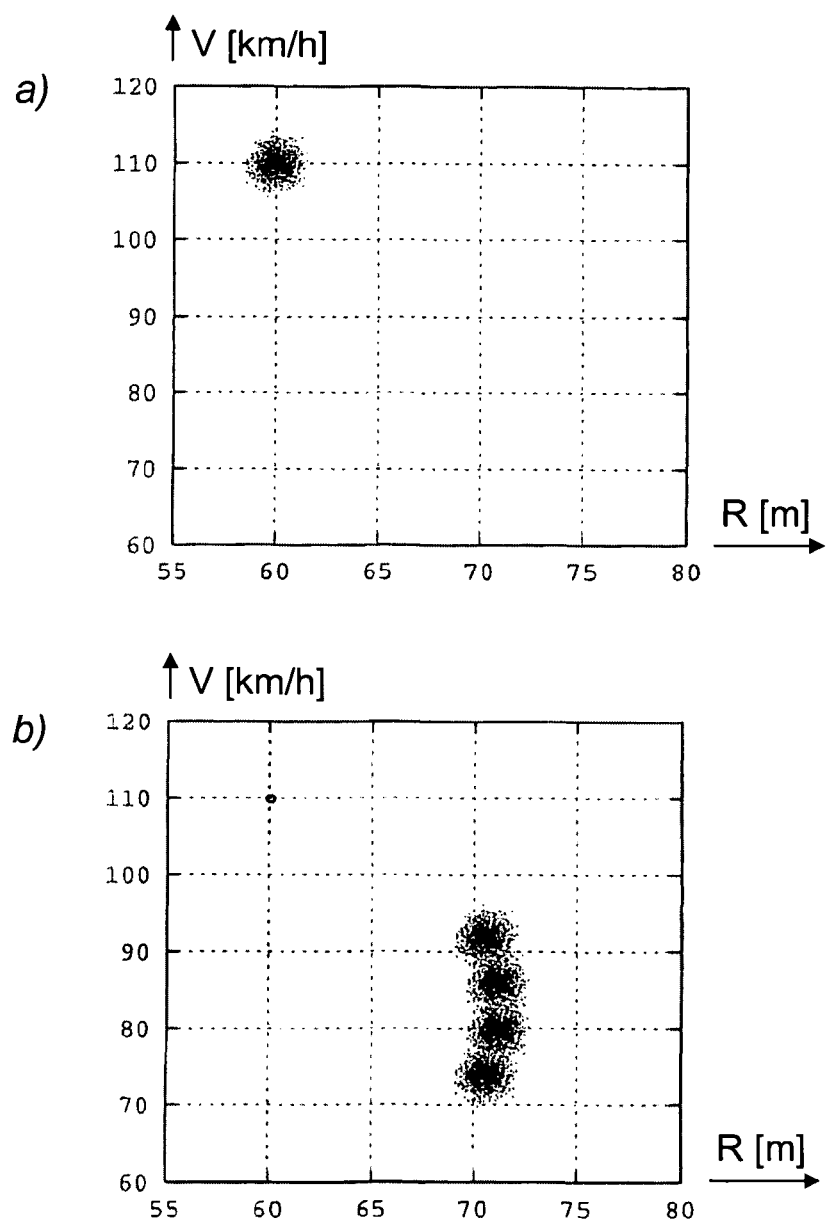
FIG. 13a is a scatter diagram obtained for an object appearing at range 60 m and approaching the system with a velocity of 110 km/h.
FIG. 13b shows four scatter diagrams obtained for the same object when, in addition to the same disturbance, one beat frequency is affected by catastrophic interference.

For comparison purposes, FIG. 13a depicts a scatter diagram of 5000 individual processor outputs obtained for an object, appearing at range 60 m, and approaching the radar system with a radial velocity of 110 km/h. In this case, there is no additional impulsive interference, and all observed beat frequencies are corrupted with a Gaussian disturbance with zero mean and standard deviation of 0.2 kHz.

In order to illustrate the problem that can be caused by extreme catastrophic interference, FIG. 13b depicts four scatter diagrams, each comprising 1200 individual processor outputs obtained for the same object. In each of the four cases, in addition to the same Gaussian disturbance, equally affecting all beat frequencies, one selected beat frequency is shifted by 30 kHz to simulate the effects of an example of catastrophic interference. In each case, the same frequency shift has been applied to the beat frequency generated by a different upslope.

As seen, in this case, the estimated range is greater than its true value, and the estimated velocity is significantly smaller than the true velocity. Consequently, the resulting estimate of 'time-to-collision' (estimated range divided by estimated velocity) may exceed the correct value by a time amount that will not be acceptable.

In accordance with a further embodiment of the invention, the effects of catastrophic interference can be significantly reduced by employing the following procedure. All K observed beat frequencies are divided into (K/2) pairs, where each pair comprises beat frequencies generated by two chirps with opposite and/or inverse slopes. Next, a first pair so formed is excluded, and the remaining [(K/2)−1] pairs are used to determine the range and velocity estimates. The process is carried out (K/2) times, and each time a different pair of beat frequencies is excluded. When all the (K/2) cases have been examined, the procedure ends, and the resulting set of (K/2) joint range-velocity estimates is analyzed.

If one of the received chirps has been corrupted in a catastrophic manner, the affected beat frequency becomes a 'rogue frequency', not related in any way to range or velocity of a detected object. In [(K/2)−1] cases, the 'rogue frequency' will be present in the set of beat frequencies under test, and each time the range and velocity will be estimated incorrectly. However, in one case, the 'rogue frequency' will be excluded from the set of beat frequencies under test: this time, the joint range-velocity estimate will be correct.

While incorrect joint range-velocity estimates will form a main cluster of [(K/2)−1] points, the correct estimate will be represented by an isolated point appearing outside the main cluster. By applying a suitable classification procedure, it is possible to identify this specific point and determine its coordinates that will represent the correct joint range-velocity estimate. When it becomes impossible to discriminate between a single point and a cluster of points, the procedure may halt, or it may just determine the worst-case 'time-to-collision'.

Figure 14:
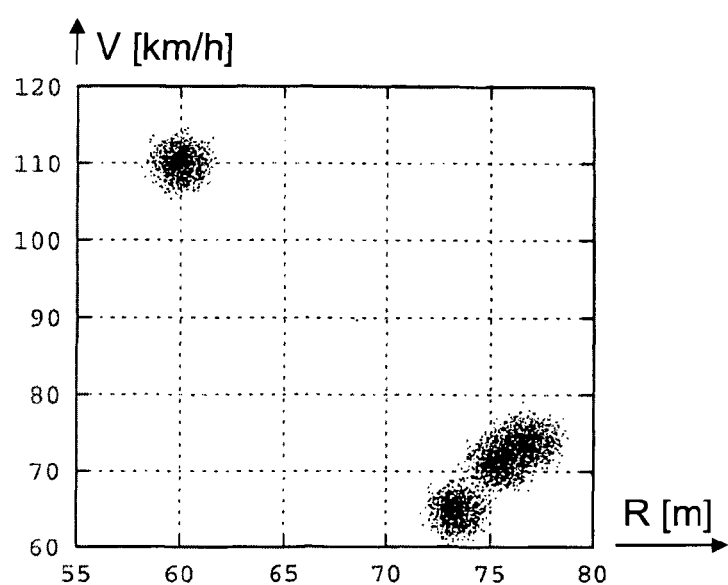
FIG. 14 depicts three scatter diagrams obtained when the 'rogue frequency' is present in the set of beat frequencies, and one scatter diagram obtained when the 'rogue frequency' has been excluded from the set.

For illustrative purposes, FIG. 14 depicts four scatter diagrams, each comprising 1200 individual processor outputs obtained for the same object. The three scatter diagrams, forming a distinct cluster, correspond to cases in which the 'rogue frequency' is present in the set of beat frequencies under test. However, the fourth scatter diagram, located at some distance from the main cluster, corresponds to the case in which the 'rogue frequency' has been excluded from the set of beat frequencies being tested. Points forming this scatter diagram provide joint range-velocity estimates that are close to the correct values. However, because estimation is based now on a smaller (six instead of eight) number of observations, the estimation error will be slightly larger. In the case of a chirp octet, the error will increase by $100[\sqrt{(4/3)}-1] \approx 15$ percent.

When the procedure is applied in a situation in which no catastrophic interference is present, all (K/2) tested sets of beat frequencies will provide similar joint range-velocity estimates. All those estimates will form a single cluster of (K/2) points, and a central point (e.g. a centre of gravity) of the cluster will then be used as a final estimate.

From a computational viewpoint, the above procedure can be implemented more efficiently by first using all the beat frequencies to calculate the estimates of range and velocity, and then excluding each time a different frequency pair to recalculate those estimates.

Figure 15:
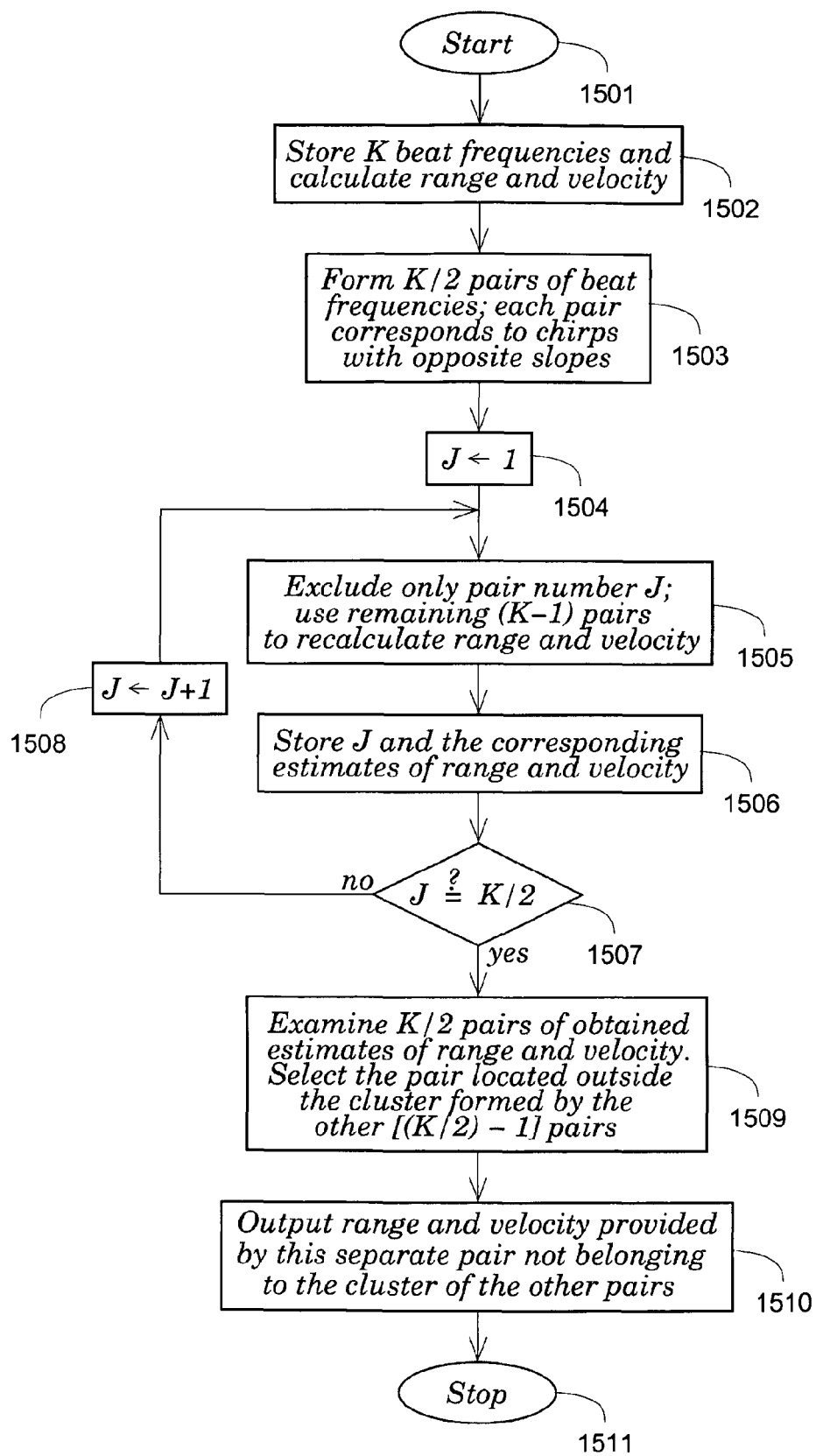
FIG. 15 is a flow diagram of the procedure designed in accordance with an embodiment of the invention to reduce the effects of a single catastrophic interference.

FIG. 15 is a flow diagram of the procedure designed in accordance with an embodiment of the invention to reduce the effects of a single catastrophic interference. Such a procedure can be implemented by a suitable processor controller.

In step 1502, K measured beat frequencies $f_{Bk}$ are stored and range and velocity of the observed object are determined.

In step 1503, K/2 pairs of beat frequencies are formed wherein each comprises chirps with opposite slopes.

In step 1504, a count J is set to be 1.

In step 1505, the pair having the count J is excluded from processing and a range and a velocity of the object are calculated from the beat frequencies ($f_{Bk}$) and their respective slopes ($S_k$) using the remaining ((K/2)−1) pairs.

In step 1506, the count J is stored together with the resulting values for range and velocity obtained in step 1505.

In step 1507, the count J is checked whether it is equal to K/2.

If it is determined in step 1507 that the count J is not equal to K/2, the count is increased by 1 in step 1508 and the steps 1505 to 1507 are repeated so that K/2 calculations of range and velocity are performed.

If it is determined in step 1507 that the count J is equal to K/2, the obtained K/2 pairs of estimates of range and velocity are examined in step 1509. As a result, the pair located outside the cluster formed by the other K/2−1 pairs is selected.

In step 1510, the result as obtained in step 1509 is outputted as range and velocity of the observed object.

Figure 16:
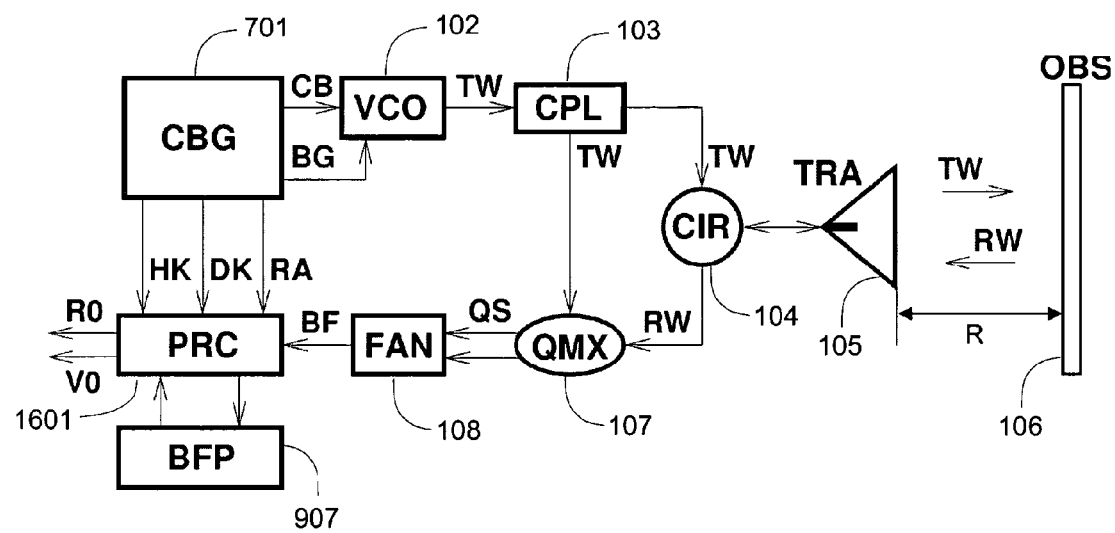
FIG. 16 is a functional block diagram of robust automotive FMCW radar, constructed in accordance with an embodiment of the invention.

FIG. 16 is a functional block diagram of automotive FMCW radar, constructed in accordance with an embodiment of the invention. This configuration has been obtained from that of FIG. 10 by incorporating a suitable processor controller PRC 1601. The controller PRC implements in hardware or software) the operations shown in the flow diagram of FIG. 15.

As shown in FIG. 16 values HK, DK and RA as discussed above are provided from the chirp burst generator CBG 701 to the processor controller PRC 1601 while the beat frequencies $f_{Bk}$ are provided from frequency analyzer FAN 108. The processor controller PRC 1601 outputs signals to and receives signals from the beat frequency processor BMP 907. Further, the processor controller PRC 1601 outputs range and velocity of the observed object.

Alternatively, the slopes or normalized slopes $S_k$ of the signal portions could be provided from the chirp burst generator CBG 701 to the processor controller PRC 1601 instead of the values HK, DK and RA shown in FIG. 16.

The interference-rejection procedure described above can be generalized to deal with more than just a single 'rogue frequency'. For example, if it is assumed that two 'rogue frequencies' may result from impulsive interference, each time two different pairs will have to be excluded from the set of beat frequencies under test. Accordingly, the total number of cases to be analyzed will increase from (K/2) to [(K²/8)−(K/4)].

For example, when a chirp octet is employed, the number of beat frequency sets under test will increase from 4 (suspected single 'rogue frequency) to 6 (suspected two 'rogue frequencies'). Furthermore, because now only four beat frequencies will be used for estimation, the estimation error will increase by 41 percent. Therefore, in order to reduce estimation errors, a longer chirp burst will have to be used; alternately, range and velocity estimation may be carried out over several chirp bursts.

The foregoing description of preferred embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilize the invention in various embodiments suited to the particular use contemplated.

The invention claimed is:

1. A method of detecting an object, the method comprising transmitting a varying-frequency signal of finite duration, and
receiving a reflection of the transmitted signal from the object,
wherein
the transmitted signal comprises a sequence of at least four adjacent portions,
the frequency of the signal varies linearly with time within each of the said portions, and
the linear frequency variation has a different slope within each of the portions, the method further comprising
determining the range and/or the velocity of the object on the basis of normalized slopes for each portion, wherein the normalization is performed by obtaining a mean slope by averaging the absolute value of each slope and dividing each slope by the mean slope.

2. The method according to claim 1, further comprising
determining beat frequencies between the transmitted signal and the received signal,
wherein
the determination of the range and/or the velocity of the object is performed for the measured beat frequencies and the corresponding normalized slopes within a portion, respectively.

3. The method according to claim 2, wherein
the determination of the range and/or the velocity of the object is performed on the basis of parameters calculated on the basis of the measured beat frequencies and the corresponding normalized slopes within a portion, respectively.

4. The method according to claim 3, wherein
the determination of the range and/or the velocity of the object is performed including the determination of a round-trip delay and a Doppler frequency of reflected signals from the object, respectively.

5. The method according to claim 1, wherein the normalized slopes satisfy predetermined conditions.

6. The method according to claim 1, wherein
the portions exist in pairs such that for each portion with a normalized slope $S_k$ there is a portion with normalized slope $-S_k$.

7. The method according to claim 1, wherein
the portions exist in pairs such that for each portion with a normalized slope $S_k$ there is a portion with normalized slope $1/S_k$.

8. A method of detecting an object according to claim 1 wherein
the portions exist in quadruples such that for each portion with a normalized slope $S_k$ there are portions with normalized slope $1/S_k$, $-1/S_k$ and $-S_k$.

9. The method according to claim 8, wherein
the ratio of maximum desired magnitude of slope to the minimum desired magnitude of slope is Z,
and the normalized slopes $S_k$ of a quadruple are $-\sqrt{Z}, -1/\sqrt{Z}, 1/\sqrt{Z}, \sqrt{Z}$.

10. The method according to claim 1, wherein
the normalization is performed by obtaining a mean slope by averaging the absolute value of each slope to calculate the geometric mean or the arithmetic mean of the slopes, and dividing each slope by the mean slope.

11. A method of detecting an object, the method comprising
transmitting a varying-frequency signal of finite duration, and
receiving a reflection of the transmitted signal from the object,
wherein
the transmitted signal comprises a sequence of at least four adjacent portions,
the frequency of the signal varies linearly with time within each of the said portions, and
the linear frequency variation has a different slope within each of the portions,
the method further comprising
determining the range and/or the velocity of the object on the basis of normalized slopes for each portion, wherein the normalization is performed by obtaining a mean slope by averaging the absolute value of each slope and dividing each slope by the mean slope;
determining beat frequencies between the transmitted signal and the received signal, wherein the determination of the range and/or the velocity of the object is performed for the measured beat frequencies and the corresponding normalized slopes within a portion, respectively
wherein the determination of the range and/or the velocity of the object is performed on the basis of parameters calculated on the basis of the measured beat frequencies and the corresponding normalized slopes within a portion, respectively and
wherein parameters $G_K$, $H_K$, and $P_K$ are calculated which are obtainable by:

$$G_K = \sum_{k=1}^{K} \frac{S_k^2}{1+S_k^2}, H_K = \sum_{k=1}^{K} \frac{1}{1+S_k^2}, P_K = \sum_{k=1}^{K} \frac{S_k}{1+S_k^2},$$

where,
$S_k$ is a normalized slope within a portion k, 4≤k≤K, and K is the total number of signal portions.

12. A method of detecting an object, the method comprising
transmitting a varying-frequency signal of finite duration, and
receiving a reflection of the transmitted signal from the object,
wherein
the transmitted signal comprises a sequence of at least four adjacent portions,
the frequency of the signal varies linearly with time within each of the said portions, and
the linear frequency variation has a different slope within each of the portions,
the method further comprising
determining the range and/or the velocity of the object on the basis of normalized slopes for each portion, wherein the normalization is performed by obtaining a mean slope by averaging the absolute value of each slope and dividing each slope by the mean slope;
determining beat frequencies between the transmitted signal and the received signal, wherein the determination of the range and/or the velocity of the object is performed for the measured beat frequencies and the corresponding normalized slopes within a portion, respectively
wherein the determination of the range and/or the velocity of the object is performed on the basis of parameters calculated on the basis of the measured beat frequencies and the corresponding normalized slopes within a portion, respectively wherein parameters $G_K$, $H_K$, and $P_K$ are calculated which are obtainable by:

$$G_K = \sum_{k=1}^{K} \frac{S_k^2}{1+S_k^2}, H_K = \sum_{k=1}^{K} \frac{1}{1+S_k^2}, P_K = \sum_{k=1}^{K} \frac{S_k}{1+S_k^2},$$

where,
$S_k$ is a normalized slope within a portion k, 4≤k≤K, and K is the total number of signal portions and, wherein the determination of the range and/or the velocity of the object is performed including the determination of a round-trip delay and a Doppler frequency of reflected signals from the object as $\tilde{\tau}_0$ and $\tilde{f}_{V0}$, respectively, where $\tilde{\tau}_0$ and $\tilde{f}_{V0}$ are obtainable by:

$$\tilde{\tau}_0 = \frac{H_K \cdot I_K + P_K \cdot Q_K}{G_K \cdot H_K - P_K^2}, \tilde{f}_{V0} = \frac{G_K \cdot Q_K + P_K \cdot I_K}{G_K \cdot H_K - P_K^2},$$

wherein $I_K$ and $Q_K$ are obtainable by:

$$I_K = -\sum_{k=1}^{K} \frac{f_{Bk} \cdot S_k}{1 + S_k^2}, Q_K = \sum_{k=1}^{K} \frac{f_{Bk}}{1 + S_k^2},$$

where,
$S_k$ is a normalized slope within a portion k and,
$f_{Bk}$ is a measured beat frequency.

13. A method of detecting an object, the method comprising
transmitting a varying-frequency signal of finite duration, and
receiving a reflection of the transmitted signal from the object,
wherein
the transmitted signal comprises a sequence of at least four adjacent portions,
the frequency of the signal varies linearly with time within each of the said portions, and
the linear frequency variation has a different slope within each of the portions,
the method further comprising
determining the range and/or the velocity of the object on the basis of normalized slopes for each portion, wherein the normalization is performed by obtaining a mean slope by averaging the absolute value of each slope and dividing each slope by the mean slope, wherein the normalized slopes satisfy predetermined conditions
wherein a predetermined condition is:

$$P_K = \sum_{k=1}^{K} \frac{S_k}{1 + S_k^2} = 0,$$

where, $S_k$ is a normalized slope within a portion k, $4 \leq k \leq K$ and
K is the total number of portions.

14. A method of detecting an object, the method comprising
transmitting a varying-frequency signal of finite duration, and
receiving a reflection of the transmitted signal from the object,
wherein
the transmitted signal comprises a sequence of at least four adjacent portions,
the frequency of the signal varies linearly with time within each of the said portions, and
the linear frequency variation has a different slope within each of the portions,
the method further comprising
determining the range and/or the velocity of the object on the basis of normalized slopes for each portion, wherein the normalization is performed by obtaining a mean slope by averaging the absolute value of each slope and dividing each slope by the mean slope,
wherein there exist a minimum magnitude of normalized slope $|S|_{min}$ and a maximum magnitude normalized slope $|S|_{max}$ that define the angular intervals $(\tan^{-1}|S|_{min}, \tan^{-1}|S|_{max})$ and $(-\tan^{-1}|S|_{max}, -\tan^{-1}|S|_{min})$ wherein,
the angles defined by the normalized slopes are equally spaced within these said angular intervals.

15. An apparatus for detecting an object, comprising
a transmitter operable to transmit a varying-frequency signal of finite duration,
a receiver operable to receive a reflection of the transmitted signal from an object,
a signal generator operable to provide the varying-frequency signal such that the transmitted signal comprises a sequence of at least four adjacent portions, such that the frequency of the signal varies linearly with time within each of the said portions and such that the linear frequency variation has a different slope within each of the portions, and
a signal processor operable to determine a range and/or a velocity of the object on the basis of normalized slopes for each portion obtained by dividing each slope by a mean slope, where the mean slope is the average of the absolute values of each slope.

16. An apparatus according to claim 15, further comprising
a beat frequency detector operable to detect beat frequencies between the transmitted signal and the received signal,
and wherein the signal processor is arranged to perform the determination of the range and/or the velocity of the object for the measured beat frequencies and the corresponding normalized slopes within a portion, respectively.

17. An apparatus according to claim 16, wherein
the signal processor is arranged to perform the determination of the range and/or the velocity of the object on the basis of parameters calculated on the basis of the measured beat frequencies and the corresponding normalized slopes within a portion, respectively.

18. An apparatus according to claim 15, wherein the signal generator further comprises
a memory for storing predefined sets of normalized slopes; and
a selector operable to randomly select one of the predefined sets of normalized slopes.

19. An apparatus for detecting an object, comprising
a transmitter operable to transmit a varying-frequency signal of finite duration,
a receiver operable to receive a reflection of the transmitted signal from an object,
a signal generator operable to provide the varying-frequency signal such that the transmitted signal comprises a sequence of at least four adjacent portions, such that the frequency of the signal varies linearly with time within each of the said portions and such that the linear frequency variation has a different slope within each of the portions, and
a signal processor operable to determine a range and/or a velocity of the object on the basis of normalized slopes for each portion obtained by dividing each slope by a mean slope, where the mean slope is the average of the absolute values of each slope;

a beat frequency detector operable to detect beat frequencies between the transmitted signal and the received signal, wherein the signal processor is arranged to perform the determination of the range and/or the velocity of the object for the measured beat frequencies and the corresponding normalized slopes within a portion, respectively, wherein the signal processor is arranged to perform the determination of the range and/or the velocity of the object on the basis of parameters calculated on the basis of the measured beat frequencies and the corresponding normalized slopes within a portion, respectively, and wherein the signal processor is arranged to calculate parameters $G_K$, $H_K$, and $P_K$ which are obtainable by:

$$G_K = \sum_{k=1}^{K} \frac{S_k^2}{1+S_k^2}, H_K = \sum_{k=1}^{K} \frac{1}{1+S_k^2}, P_K = \sum_{k=1}^{K} \frac{S_k}{1+S_k^2},$$

where, $S_k$ is a normalized slope within a portion k, $4 \leq k \leq K$ and

K is the total number of portions.

20. A method of detecting an object, the method comprising transmitting a varying-frequency signal of finite duration, and receiving a reflection of the transmitted signal from the object, wherein the transmitted signal comprises a sequence of at least four adjacent portions, the frequency of the signal varies linearly with time within each of the said portions, and the linear frequency variation has a different slope within each of the portions, determining the range and/or the velocity of the object on the basis of normalized slopes for each portion, wherein the normalization is performed by obtaining a mean slope by averaging the absolute value of each slope and dividing each slope by the mean slope;

determining beat frequencies between the transmitted signal and the received signal, wherein, the frequency of the signal varies linear, and the portions of the transmitted signal exist in K/2 pairs of opposite and/or inverse normalized slopes, and further comprising calculating a range and/or velocity of the object from the beat frequencies and their respective normalized slopes K/2 times, each time with one of the pairs excluded from the calculation process, determining if a calculation with a pair generates a result located outside of a cluster formed by the results of the other pairs, and outputting the range and/or velocity given by the result.

* * * * *